(12) United States Patent
Khlat

(10) Patent No.: US 8,903,333 B1
(45) Date of Patent: Dec. 2, 2014

(54) ADAPTIVE ANTENNA TUNER FOR A TRANSCEIVER

(75) Inventor: Nadim Khlat, Cugnaux (FR)

(73) Assignee: RF Micro Devices, Inc., Greensboro, NC (US)

( * ) Notice: Subject to any disclaimer, the term of this patent is extended or adjusted under 35 U.S.C. 154(b) by 404 days.

(21) Appl. No.: 13/149,216

(22) Filed: May 31, 2011

Related U.S. Application Data

(60) Provisional application No. 61/355,428, filed on Jun. 16, 2010, provisional application No. 61/379,019, filed on Sep. 1, 2010.

(51) Int. Cl.
*H04B 1/40* (2006.01)

(52) U.S. Cl.
USPC .............. 455/77; 343/722; 343/750; 343/861

(58) Field of Classification Search
USPC ............................. 343/722, 750, 861; 455/77
See application file for complete search history.

(56) References Cited

U.S. PATENT DOCUMENTS

| | | | |
|---|---|---|---|
| 6,084,920 A | 7/2000 | Ferdinandsen | |
| 6,291,994 B1* | 9/2001 | Kim et al. | 324/300 |
| 6,538,506 B2* | 3/2003 | Hareyama | 330/51 |
| 7,127,222 B2 | 10/2006 | Kim et al. | |
| 7,245,519 B2* | 7/2007 | McQuirk et al. | 365/149 |
| 7,415,254 B2 | 8/2008 | Kuriyama et al. | |
| 7,418,244 B2 | 8/2008 | Montalvo | |
| 7,840,200 B2* | 11/2010 | Kang et al. | 455/188.1 |
| 8,213,886 B2 | 7/2012 | Blin | |
| 8,351,372 B2 | 1/2013 | Padovani et al. | |
| 8,369,466 B2 | 2/2013 | Ito | |
| 2002/0175870 A1* | 11/2002 | Gleener | 343/745 |
| 2008/0211320 A1* | 9/2008 | Cook et al. | 307/149 |
| 2009/0109880 A1 | 4/2009 | Kim et al. | |
| 2009/0196223 A1 | 8/2009 | Nalbantis et al. | |
| 2009/0231220 A1* | 9/2009 | Zhang et al. | 343/722 |
| 2010/0105425 A1 | 4/2010 | Asokan | |
| 2010/0182216 A1* | 7/2010 | Schmidhammer | 343/861 |
| 2011/0086630 A1 | 4/2011 | Manssen et al. | |

OTHER PUBLICATIONS

3GPP TS 25.101 "User Equipment (UE) radio transmission and reception (FDD)" V9.2.0 (Dec. 2009) pp. 15-19.*
3GPP TS 25.211 "Physical channels and mapping of transport channels onto physical channels (FDD)" V8.6.0 (Dec. 2009), pp. 10-46.*
Kramer, B.A. et al., "Fundamental Limits and Design Guidelines for Miniaturizing Ultra-Wideband Antennas," IEEE Antennas and Propagation Magazine, Aug. 2009, pp. 57-69, vol. 51, No. 4, IEEE.
Correction [to "Fundamental Limits and Design Guidelines for Miniaturizing Ultra-Wideband Antennas" Aug. 9 57-69], IEEE Antennas and Propagation Magazine, Oct. 2009, pp. 60-60, vol. 51, No. 5. IEEE.

(Continued)

*Primary Examiner* — Wen Huang
(74) *Attorney, Agent, or Firm* — Withrow & Terranova, P.L.L.C.

(57) ABSTRACT

An antenna tuner provides a pass band with a transmission resonant frequency and a receive resonant frequency. In this manner, the pass band of the antenna tuner can simultaneously provide matching at both a transmission frequency and a receive frequency, when both transmission signals and receive signals are received on the same antenna. The antenna tuner includes a first capacitive element that is coupled to series resonate with the antenna and a low-pass pi network.

25 Claims, 22 Drawing Sheets

(56) References Cited

OTHER PUBLICATIONS

Matthaei, G. et al, "Microwave Filters, Impedance-Matching Networks, and Coupling Structures," 1980, Artech House, Inc., Norwood, MA (Reprint of the edition published by McGraw-Hill Book Company, Inc., 1964).

Ranta, T. et al., "Antenna Tuning Approach Aids Cellular Handsets," Microwaves & RF, Nov. 2008, pp. 82-92, Penton Media, Inc.

Non-final Office Action for U.S. Appl. No. 13/149,265 mailed Feb. 21, 2013, 9 pages.

Author Unknown, 3GPP TS 25.214, "Technical Specification Group Radio Access Network; Physical layer procedures (FDD)" V8.9.0, Mar. 2010, pp. 15-18.

Final Office Action for U.S. Appl. No. 13/149,306, mailed Sep. 12, 2013, 59 pages.

Notice of Allowance for U.S. Appl. No. 13/149,265, mailed Aug. 19, 2013, 6 pages.

Non-Final Office Action for U.S. Appl. No. 13/149,306, mailed Aug. 4, 2014, 57 pages.

* cited by examiner

ADAPTIVE ANTENNA TUNER FOR A TRANSCEIVER

RELATED APPLICATIONS

This application claims the benefit of provisional patent application Ser. No. 61/355,428 filed Jun. 16, 2010 and provisional patent application 61/379,019, filed Sep. 1, 2010, the disclosures of which are hereby incorporated herein by reference in their entireties.

FIELD OF THE DISCLOSURE

The present disclosure relates to an antenna tuner control system and methods of controlling an antenna tuner.

BACKGROUND

With the advent of 3G and 4G networks and the development of transport channels with higher modulation bandwidth and data rates, such as Long Term Evolution (LTE) transport channels, increasing the quality of the link between the base station and the mobile user device is critical to improving service. One of the most difficult problems in maintaining a quality link between the mobile user device and the base station is the constant variation of objects and fluctuating environmental conditions between the mobile user device and the base station. For example, an antenna's input impedance as seen from a base station can fluctuate chaotically as a user varies the placement of his body relative to the antenna. These problems may be particularly problematic for mobile user devices having transceivers that both transmit and receive from the same antenna. The antenna tuner in these systems must be capable of being tuned so that a receive signal can be received from the base station within a physical downlink channel and a transmission signal can be transmitted to the base station within a physical uplink channel, on the same antenna.

One prior art method of maintaining a quality link between the mobile user device and the base station is to use a directional coupler in or directly connected to the antenna tuner of the mobile user device. The direction coupler detects a mismatch between the power level of the transmission signal being received by the antenna tuner and the power level reflected back from the antenna tuner. In other words, directional couplers are utilized to measure the $S_{11}$ parameter of an antenna tuner. However, optimizing the $S_{11}$ parameter of the antenna tuner when both transmission signals and receive signals are being transmitted through the antenna tuner does not guarantee optimization of the power level of the transmission signal delivered at the antenna. Similarly, optimizing the $S_{11}$ parameter is not directly related to and does not guarantee optimization of the power level of the receive signal at the receiver circuit of the transceiver.

Utilizing the direction coupler with the antenna tuner to determine the power level of the transmission signal also limits the ability of the transmission circuit to adjust the power level in accordance with transmission power control (TPC) information sent from the base station. As is known in the art, base stations may provide TPC information to the mobile user device to request a change in the power level of the transmission signal being provided by the mobile user device to the base station. The transmitter circuit of the transceiver in the mobile device will change the amplification provided at the transmitter circuit of the transceiver to adjust the power level of the transmission signal. Similarly, the antenna tuner may adjust its impedance to adjust the power level as requested by the base station. Unfortunately, since the directional tuner only measures the $S_{11}$ parameter and both the transmission signal and the receive signal are being transmitted through the antenna tuner, the mobile device cannot detect whether the power level of the transmission signal was actually adjusted in accordance with the TPC information. Instead, the actual change of the power level of the transmission signal is not known until the transmission signal reaches the base station. This limits both the speed and the accuracy at which power changes to the transmission signal can be made.

Another problem with prior art transceivers having antenna tuners utilized with both transmission signals and receive signals is that the Q-factor of the pass band for the antenna tuner is limited by the bandwidth of the pass band. This limitation is known as the Bode-Fano limit and may be expressed for a parallel RC load impedance as:

$$\int_0^\infty \ln\frac{1}{|\Gamma(\omega)|}\,d\omega = \frac{\pi}{RC}$$

Where $\omega$ is the angular frequency, R is the resistance value of the resistor, C is the capacitance value of the capacitor and $\Gamma(\omega)$ is the reflection coefficient of the antenna tuner. If we assume maximum mismatch outside of the pass band and maximum matching within the pass band, and we substitute using the known definition of the Q-factor for the pass band, the relationship between the Q-factor and bandwidth may be expressed as:

$$\frac{\omega c}{Q} = \Delta\omega$$

where $\omega c$ is the center frequency of the pass band, $\Delta\omega$ is the 3 dB bandwidth, and Q is the Q-factor.

This expressions show that the bandwidth is inversely proportion to the Q-factor. Thus to increase the bandwidth we must decrease the Q-factor. As a result, a prior art antenna tuner in a mobile device that receives both the receive signal within a physical downlink channel and a transmission signal within a physical uplink channel has a Q-factor. Based on the expression shown above and if we assume that the reflection coefficient is substantially uniform throughout the pass band of the antenna tuner, the Q-factor of the pass band of the prior art antenna tuner is limited by the offset between the receive frequency defined by the physical downlink channel and the transmission frequency defined by the physical uplink channel. This is because this is the minimum bandwidth required to receive and transmit on the physical downlink channel and physical uplink channel. Thus, it would be desirable to increase the Q-factor toward the receive frequency and sacrifice the Q-factor at the transmission frequency, or vice versa, to increase the quality of the link between the mobile device and the antenna. Ideally however, it would be desirable to provide simultaneous matching at both the receive frequency and the transmission frequency and not have to sacrifice the Q-factor at either the receive frequency or transmission frequency.

SUMMARY

This disclosure includes an antenna tuner that provides a pass band that can provide simultaneous matching at a transmission frequency and a receive frequency. The pass band of the antenna tuner has a transmission resonant frequency associated with the transmission frequency and a receive resonant frequency associated with the receive frequency. Accordingly, the pass band allows for simultaneous matching at both the transmission frequency and the receive frequency. To do this, the pass band is degraded between the transmission resonant frequency and the receive resonant frequency, where matching may not be required.

In one embodiment, the antenna tuner includes a first capacitive element, and a low-pass pi network. The first capacitive element has a variable capacitance and may be coupled in series with the antenna so that the first capacitive element and the antenna series resonate with one another. Thus, an intermediate frequency first capacitive element. The low pass pi network includes a first shunt connected segment, a second shunt connected segment, and a series connected segment coupled between the first shunt connected segment and the second shunt connected segment. The series connected segment may include an inductive element, while the first shunt connected segment and the second shunt connected segment each may include a second capacitive element and a third capacitive element, respectively. Accordingly, the low-pass pi network provides the dual transmission resonant frequency and receive resonant frequency of the antenna tuner.

By varying the variable capacitances of the first, second, and third capacitive element, an impedance response of the antenna tuner may be controlled to adjust the pass band. The antenna tuner may be utilized in a transceiver for a mobile user device that receives both the transmission signal and the receive signal on the same antenna. An antenna tuner control system may adjust the pass band of an antenna tuner in accordance with transmission power control (TPC) information and receive power control (RPC) information.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of this disclosure, and together with the description serve to explain the principles of this disclosure.

DETAILED DESCRIPTION OF THE PREFERRED EMBODIMENTS

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Furthermore, embodiments described in this disclosure may describe certain systems as being implemented using software modules. As is apparent to one of ordinary skill in the art, any system that uses software modules implemented using computer executable instructions and general purpose computer hardware, such as processors, have a hardwired hardware circuit analog that utilizes hardwired hardware specifically configured to provide the same functionality as the software module. Accordingly, this disclosure does not intend to limit the systems described herein to software implementations. Instead, these systems may be implemented using software modules, hardwired hardware circuits, or some combination of both software modules and hardwired hardware circuits. All of these implementations are considered to be within the scope of this disclosure.

Figure 1:
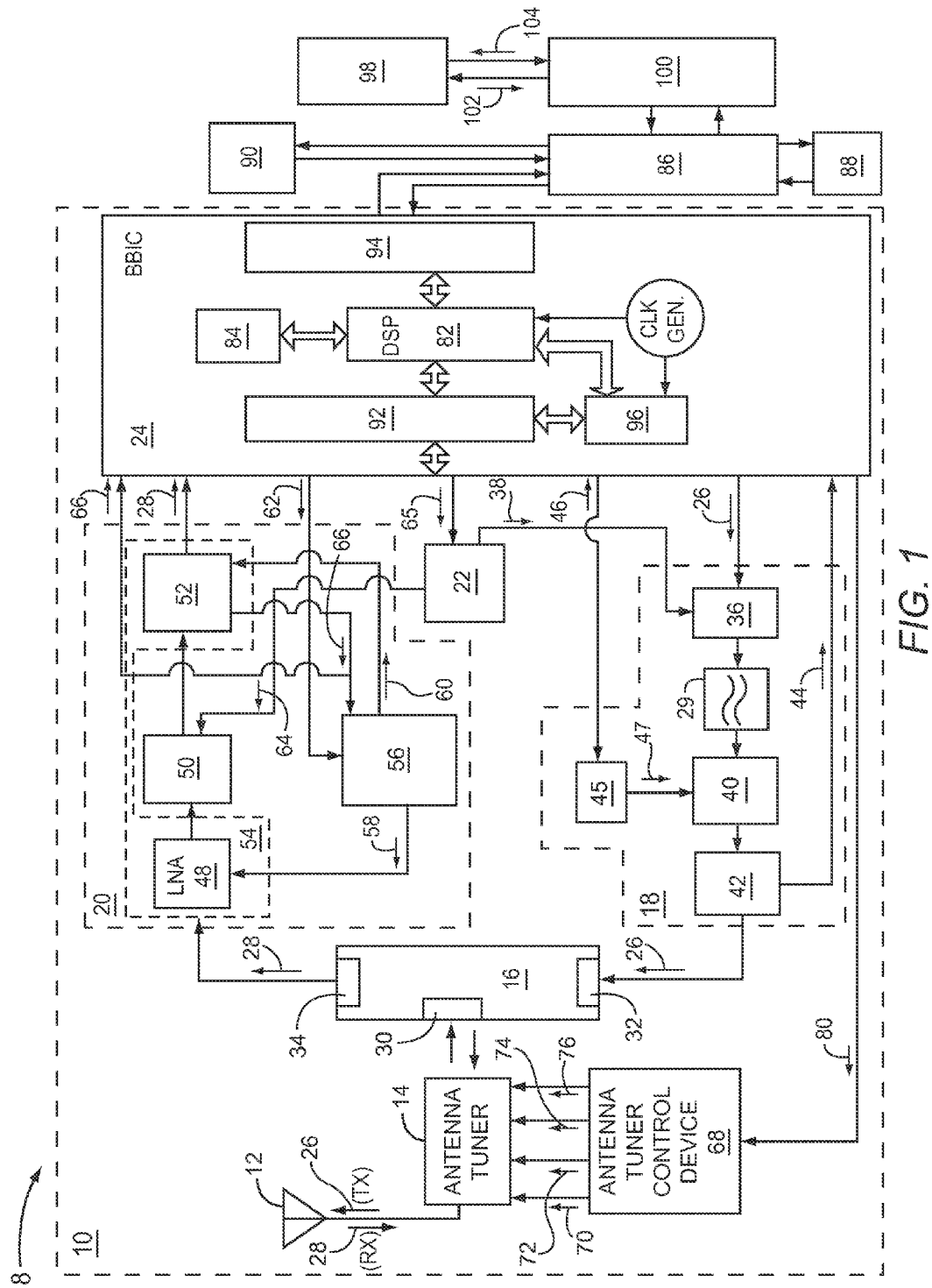
FIG. 1 illustrates a mobile user device having one embodiment of a transceiver in accordance with this disclosure.

The disclosure relates to embodiments of a transceiver that may be used in mobile user devices, power control systems associated with the transceiver that control the current power levels of transmission signals and receive signals, and methods of operating the same. FIG. 1 illustrates a block diagram of one embodiment of a mobile user device 8 having a transceiver 10 in accordance with this disclosure. In this embodiment, the transceiver 10 has an antenna 12, an antenna tuner 14, a multiplexer 16, a transmitter circuit 18, a receiver circuit 20, a frequency synthesizer 22, and a baseband integrated circuit (BBIC) 24. A transmission signal 26 is transmitted within a physical uplink channel and a receive signal 28 is received within a physical downlink channel at the antenna 12. The antenna tuner 14 tunes a pass band of the antenna tuner 14 so that both the transmission signal 26 within the physical uplink channel and the receive signal 28 within the physical downlink channel can be transmitted and received by the same antenna 12.

The multiplexer 16 is coupled between the antenna tuner 14 and the transmitter circuit 18 and also between the antenna tuner 14 and the receiver circuit 20. In this embodiment, the multiplexer 16 operates as a duplexer. The multiplexer 16 includes a first multiplexer port 30, a second multiplexer port 32, and a third multiplexer port 34. The first multiplexer port 30 is connected to the antenna tuner 14 to transmit the transmission signal 26 within the physical uplink channel from the transmitter circuit 18 to the antenna tuner 14 and to receive the receive signal 28 within the physical downlink channel from the antenna 12. The illustrated multiplexer 16 operates as a duplexer and includes filtering that may be tuned to the physical uplink channel and physical downlink channel. The second multiplexer port 32 is connected to the transmitter circuit 18 to receive the transmission signal 26 within the physical uplink channel from the transmitter circuit 18. The third multiplexer port 34 is connected to the receiver circuit 20 to transmit the receive signal 28 within the physical downlink channel to the receiver circuit 20.

While the transceiver 10 is illustrated as receiving a single transmission signal 26 and a single receive signal 28, the antenna 12 may actually transmit various additional transmission signals each transmitted on a different physical uplink channels and receive various additional receive signals each received on various different physical downlink channels. For example, in 3G and 4G networks, the transceiver 10 may send a plurality of different transmission signals within various different physical uplink channels to a base station and receive a plurality of different receive signals within various different physical downlink channels from the base station. As would be apparent to one of ordinary skill in the art in light of this disclosure, the transceiver 10 may include additional circuitry, for example, additional parallel transmitter chains and additional receiver chains, partially parallel transmitter chains and additional receiver chains (i.e. additional transmitter chains and additional receiver chains that share some but not all circuit components and may also include circuitry for specific physical downlink channels and specific physical uplink channels), for the various different physical uplink channels and different physical downlink channels. The different physical uplink channels and different physical downlink channels are defined by a transmission frequency and a receive frequency, respectively, but transmission signals and receive signals within these physical uplink channels and physical downlink channels may also be distinguished by time-division modulation techniques, frequency divisional modulation techniques, and code-division modulation techniques, or the like, and in addition some combination of any of the aforementioned techniques. The multiplexer 16 may thus provide filtering for some or all of these additional transmission signals within the various different physical uplink channels and additional receive signals within the various additional downlink channels. The first multiplexer port 30, second multiplexer port 32, and third multiplexer port 34 thus may include one or more switches to switch among the different transmitter chains and receiver chains of the transceiver 10 and also to provide time division modulation in accordance to a start time and stop time, if necessary.

In FIG. 1, the transmitter circuit 18 operates to up convert the transmission signal 26 generated by the BBIC 24 into the physical uplink channel. The transmission signal 26 may be generated at baseband or at an intermediate frequency (IF) by the BBIC 24. To transmit the transmission signal 26 to the base station, the transmitter circuit 18 places the transmission signal 26 within the physical uplink channel. The physical uplink channel is defined by a transmission frequency but may also be associated with a scrambling code, channel code, start and stop time, and phase (0 or $\pi/2$ radians for in-phase and quadrature phase signals transmitted from the antenna 12 separately), a specific orthogonal signature sequence, and/or the like. The BBIC 24 may output the transmission signal 26 at baseband or in the alternative at an intermediate frequency (IF), and code the signal in accordance to the scrambling code and/or channel code. The transmission signal 26 may already be encoded by the BBIC 24 in accordance to the scrambling code and/or channel code prior to being up converted within the physical uplink channel. Also, the BBIC 24 may generate the transmission signal 26 as an in phase signal and a quadrature phase signal.

To provide the transmission signal 26 within the physical uplink channel, the transmitter circuit 18 includes an up converter circuit 36, such as a mixer circuit, that is configured to up convert the transmission signal 26. The up converter circuit 36 may receive a local oscillation signal 38 from the frequency synthesizer operating at a local oscillation frequency. The local oscillation frequency is provided so that the transmission signal 26 operates at the transmission frequency of the physical uplink channel. The up converter circuit 36 may also combine the in phase signal and the quadrature phase signal to generate a single signal, if the BBIC 24 originally generated the transmission signal 26 as the aforementioned orthogonal signals.

Upon up converting the transmission signal 26 into the physical uplink channel, the transmitter circuit 18 may include a filter circuit 29 to extract the appropriate harmonics of up converted transmission signal 26 after being up converted by the up converter circuit 36. Subsequently, the transmitter circuit 18 includes a transmission amplification circuit 40 that amplifies the transmission signal 26 in accordance to a first adjustable gain. In the illustrated embodiment, the transmission amplification circuit 40 is illustrated at a particular location within the transmitter circuit 18 and amplifies the transmission signal 26 within the physical uplink channel. However, the transmission amplification circuit 40 may be a single amplification device having a single adjustable gain or may be a plurality of different amplification devices. One or more of the different amplification devices may have adjustable gains and the cumulative gain of the plurality of different amplification devices may provide the first adjustable gain. Thus, in the alternative, the transmission amplification circuit 40 may include different amplification devices at different locations of the transmitter circuit 18.

Next, the transmission signal 26 may be provided to a coupler 42 that is operable to generate a transmit feedback signal 44 having a signal level associated with a current power level of the transmission signal 26. Since the coupler 42 may be provided as part of the transmitter circuit 18, the coupler 42 can detect the current power level of the transmission signal 26 in isolation from the receive signal 28. The transmit feedback signal 44 may then be provided as feedback to the BBIC 24. One of the advantages of the transceiver 10 is that the coupler 42 may be provided to internally detect the forward power of the transmission signal 26. Thus, the transceiver 10 can close a control loop that controls the current power level of the transmission signal 26 internally without having to wait for a base station to detect if the change in power was actually provided accurately. In this embodiment, the coupler 42 is coupled between the multiplexer 16 and the transmitter circuit 18

The first adjustable gain may be controlled by a transmit power control device 45, which receives a transmission power control signal 46. The transmission power control signal 46 may be utilized by the transmit power control device 45 to generate a gain control signal 47 that sets the first adjustable gain. The transmission signal 26 may then be provided to the second multiplexer port 32 of the multiplexer 16 for transmission to the antenna 12.

Next, the transceiver 10 also includes the receiver circuit 20, which is operable to down convert the receive signal 28 out of the physical downlink channel. The receive signal 28 was placed in the physical downlink channel by a base station. The receiver circuit 20 removes the receive signal 28 from the physical downlink channel so that the information within the receive signal 28 may be processed by the BBIC 24.

The physical downlink channel may be defined by a receive frequency. The physical downlink channel may also be associated with a scrambling code, channel code, start and stop time, and phase (0 or $$\frac{\pi}{2}$$

radians for in-phase and quadrature phase signals received at the antenna 12 separately), a specific orthogonal signature sequence, and/or the like. The first multiplexer port 30 and/or third multiplexer port 34 may include one or more switches to select among various receive chains, and so that the receive signal 28 is received in accordance to the start and stop time, if required. The receive signal 28 is received within the physical downlink channel by the receiver circuit 20 from the third multiplexer port 34 of the multiplexer 16. The receiver circuit 20 may include a low noise amplifier (LNA) 48, an IF converter circuit 50, and an IF power amplifier 52. The LNA 48 and the IF power amplifier 52 are provided at different parts of the receiver circuit 20 to form part of a receiver amplification circuit 54. Additional amplification devices may be provided or, in the alternative, the receiver amplification circuit 54 may be a single amplification device provided at a single location of the receiver circuit 20. The LNA 48 filters and amplifies the receive signal 28 within the physical downlink channel and the IF power amplifier 52 amplifies the receive signal 28 after being down converted out of the physical downlink channel by the IF converter circuit 50. The gains of the LNA 48 and IF power amplifier 52 combine to provide a second adjustable gain of the receiver amplification circuit 54. The gain of the LNA 48 and the IF power amplifier 52, and thus the receiver amplification circuit 54 are controlled by a receive power control device 56, which provides receive gain control signals 58, 60 to the receiver amplification circuit 54 to control the second adjustable gain. The receive gain control signals 58, 60 may be controlled in accordance to a receive power control signal 62 from the BBIC 24.

The IF converter circuit 50 may be a mixer circuit operable to down convert the receive signal 28 out of the physical downlink channel to an IF frequency. In the alternative, a baseband converter may be provided to down convert to baseband. The frequency synthesizer 22 may provide a local oscillation signal 64 having a local oscillation frequency such that the receive signal 28 is down converted from the receive frequency of the physical downlink channel to the IF frequency. The BBIC 24 may receive the receive signal 28 at the IF frequency and further down convert the receive signal 28 from the IF frequency to baseband. The IF converter circuit 50 may also output the receive signal 28 as an in phase signal and a quadrature phase signal.

The BBIC 24 may receive the transmission signal 26 at baseband or in the alternative at an IF frequency, and decode the signal in accordance to the scrambling code and/or channel code. Note that the receiver circuit 20, in the alternative, may include a baseband converter, the local oscillation signal 64 may thus be the same as the local oscillation signal 38. The frequency synthesizer 22 may receive a local oscillation signal 65 from the BBIC 24 that allows the frequency synthesizer 22 to generate the local oscillation signal 38 and the local oscillation signal 64. Additional filter circuits (not shown) may be provided in the receiver circuit 20 to filter unwanted harmonics of the receive signal 28 after down converting to the IF frequency.

Note that the transmitter circuit 18 and receiver circuit 20 of FIG. 1 are illustrated as having a single transmitter chain for the physical uplink channel and a single receive chain for the physical downlink channel, respectively. However, the transmitter circuit 18 and receiver circuit 20 may also include a plurality of other transmitter chains and other receive chains for multiple physical uplink channels and physical downlink channels. These physical uplink channels and physical downlink channels may be associated with one another to form transport channels. The transport channel may include a single physical uplink channel and physical downlink channel or a plurality of physical uplink channels and physical downlink channels. The antenna 12 may receive transmission signals and receive signals from the physical uplink channels and downlink channels of a multitude of transport channels. Switches connected to or within the first multiplexer port 30, the second multiplexer port 32, and/or the third multiplexer port 34 may coordinate signal traffic among the antenna tuner 14 and the multiple transmitter chains in the transmitter circuit 18 and receive chains in the receiver circuit 20 for the various different transmission signals and receive signals.

Referring again to FIG. 1, the BBIC 24 receives the receive signal 28 at baseband or an IF frequency and processes the information provided within the receive signal 28. By receiving the receive signal 28, the BBIC 24 may determine a current power level of the receive signal 28. In the alternative, a receive feedback signal 66 having a signal level associated with the current power level of the receive signal 28 is provided to the BBIC 24. Based on the current power level of the receive signal 28 detected by the BBIC 24, the BBIC 24 may transmit the receive power control signal 62 to the receive power control device 56 and control the current power level of the receive signal 28, as explained in further detail below. The receive power control device 56 generates gain control signal 58, 60 based on the receive power control signal 62. The gain control signal 58 controls an adjustable gain of the LNA 48 while the gain control signal 60 controls an adjustable gain of the IF power amplifier 52. By controlling the adjustable gain of the LNA 48 and the adjustable gain of the IF power amplifier 52, the receive power control device 56 controls the second adjustable gain of the receiver amplification circuit 54. The receive power control device 56 and the IF power amplifier 52 may be connected so as to form an automatic gain control (AGC) loop. Thus, the IF power amplifier 52 may also utilize the receive feedback signal 66 to provide automatic gain control for adjusting the second adjustable gain so that the current power level of the receive signal 28 is at the desired power level.

The transceiver 10 may also include an antenna tuner control device 68 that generates impedance control signals 70, 72, 74, 76 that each control the variable reactance values of reactive impedance elements within the antenna tuner 14. For example, the antenna tuner 14 may include various programmable capacitor arrays coupled to other reactive components and configured to provide a pass band that admits the transmission frequency of the physical uplink channel and receive frequency of the physical downlink channel within the antenna tuner 14. Impedance control signals 70, 72, 74, 76 may control switches within the programmable capacitor arrays, therefore varying the capacitive value of the programmable capacitor array and therefore altering the impedance response of the antenna tuner 14. In this manner, the antenna tuner control device 68 can adjust the pass band of the antenna tuner 14. As explained in further detail below, the antenna tuner 14 may also be tuned to control the current power level of the transmission signal 26 and the receive signal 28 by adjusting the pass band of the antenna tuner 14. The BBIC 24 transmits an antenna tuner control signal 80 to the antenna tuner control device 68. The antenna tuner control device 68 generates the impedance control signals 70, 72, 74, 76 based on the antenna tuner control signal 80, and thus adjusts the pass band by varying the impedance response of the antenna tuner 14.

The BBIC 24 may include a digital signal processor (DSP) 82 and a non-transitory computer readable medium, such as local memory 84. The local memory 84 may store computer executable instructions that when executed by the DSP 82 operate as software modules. The mobile user device 8 may also include a microprocessor 86, other control logic, and a non-transitory computer readable medium, such as local memory 88, that are external to the BBIC 24. The local memory 88 may also store computer executable instructions that can be executed by the microprocessor 86 to operate as software modules. Furthermore, the mobile user device 8 may include a non-transitory computer readable medium, such as non-volatile memory devices 90 that may also be utilized to store computer executable instructions that may be transferred to the local memory 84 and/or local memory 88 and executed the DSP 82 and/or microprocessor 86. These software modules may include a transceiver power control software module for a transceiver power control system, as explained in further detail below.

Next, the BBIC 24 may receive the receive signal 28, the transmit feedback signal 44, and the receive feedback signal 66 as input signals from the transceiver 10, and may transmit the transmission signal 26, the transmission power control signal 46, the local oscillation signal 65, the receive power control signal 62, and the antenna tuner control signal 80 as output signals to the components of the transceiver 10. To receive and transmit the input and output signal from the transmitter circuit 18 and the receiver circuit 20, the BBIC 24 may include front end interface devices 92. These front end interface devices 92 may have analog to digital (A/D) converters and other circuitry configured to provide the input signals in the appropriate manner for the DSP 82 as well as provide timing functions for communication with the DSP 82. In this embodiment, the receive signal 28, the transmit feedback signal 44, and the receive feedback signal 66 may be analog signals that need to be converted into digital signal for processing by the DSP 82. In the alternative embodiments, the (A/D) converters may be provided externally from the BBIC 24, for example within the transmitter circuit 18 and receive circuit 20. Also, since the receive signal 28 is provided at an IF frequency, the front end interface devices 92 may also include devices that down convert the receive signal 28 from the IF frequency to baseband if necessary.

The front end interface devices 92 may also have digital to analog (D/A) converters and other circuitry to format the output signals in accordance with the requirements of the transmitter circuit 18 and receiver circuit 20. In this embodiment, the BBIC 24 generates the transmission signal 26, the transmission power control signal 46, the receive power control signal 62, and the antenna tuner control signal 80, as digital signals. A D/A converter may be provided in the front end interface device 92 to convert the transmission signal 26 into an analog signal. In the alternative, the D/A converter may be provided within the transmitter circuit 18. The transmission power control signal 46, the receive power control signal 62, and the antenna tuner control signal 80 may be provided to the transmit power control device 45, the receive power control device 56, and the antenna tuner control device 68, respectively, as digital signals. However, the front end interface devices 92 may include formatting circuitry, voltage control circuitry, and the like, to provide the transmit power control device 45, the receive power control device 56, and the antenna tuner control device 68, in accordance with the requirements of the transmit power control device 45, the receive power control device 56, and the antenna tuner control device 68.

Note that the above discussion regarding the various signals of the transceiver 10 and the DSP 82 are simply illustrative. For example, the transmitter circuit 18 and receiver circuit 20 may have a plurality of transmitter chains and receiver chains and thus the DSP 82 may provide a plurality of transmission power control signals and receive power control signals to control amplification circuits in each transmitter chain and receiver chain. Alternative embodiments of the transceiver 10 may have different signaling schemes in which the signals described above may actually be provided by a multitude of different signals or the different signals described above may be provided within a single signal, and these signals may be digital, analog, or digital and analog at different parts of the transceiver 10. The particular signaling scheme employed by the transceiver 10 may depend on the electronic components utilized in the transceiver 10 and the circuit topology of the antenna tuner 14, transmitter circuit 18, and the receiver circuit 20. In turn, these electronic components and circuit topology may vary in accordance with the physical uplink channels and physical downlink channels processed by the transceiver 10.

Referring again to FIG. 1, the DSP 82 may extract the information from the receive signal 28 after receiving the receive signal 28 from the front end interface devices 92. Some of the information from the receive signal 28 may be transmitted to the microprocessor 86 and other control logic of the mobile user device 8. To do this, the BBIC 24 may include back end interface devices 94 that are operable to format and provide timing functions to communicate the information to the microprocessor 86, other control logic, and the non-volatile memory devices 90. The back end interface devices 94 may also be operable to transmit information to the components of the BBIC 24. Note that the front end interface devices 92 and the back end interface devices 94 are not necessarily mutually exclusive. For example, front end interface devices 92 and back end interface devices 94 may share one or more communication buses for communicating with the DSP 82. These communication buses may also be utilized by the local memory 84 to communicate with the DSP 82. To generate the local oscillation signal 65, the BBIC 24 may include a controlled oscillator 96. The controlled oscillator 96 may be operable to generate the local oscillation signal 65, which is processed by the DSP 82 and transmitted to the frequency synthesizer 22.

As shown in FIG. 1, the mobile user device 8 may include user input and output devices 98 that receive and communicate information externally to and from a user. For example, user input and output devices 98 may include speakers, a microphone, a display, user input keys, and the like. A user device interface 100 may be provided to receive user input signals 102 and transmit user output signals 104 to the user input and output devices 98. The user input signals 102 and user output signals 104 may include any type of information received or presented to a user by mobile user device 8. For example, the transceiver 10 may be utilized in mobile user device 8 that have 3G and 4 G communication capabilities and thus user input signals 102 and user output signals 104 may include any type information provided by any 3G and 4G service.

Figure 1A:
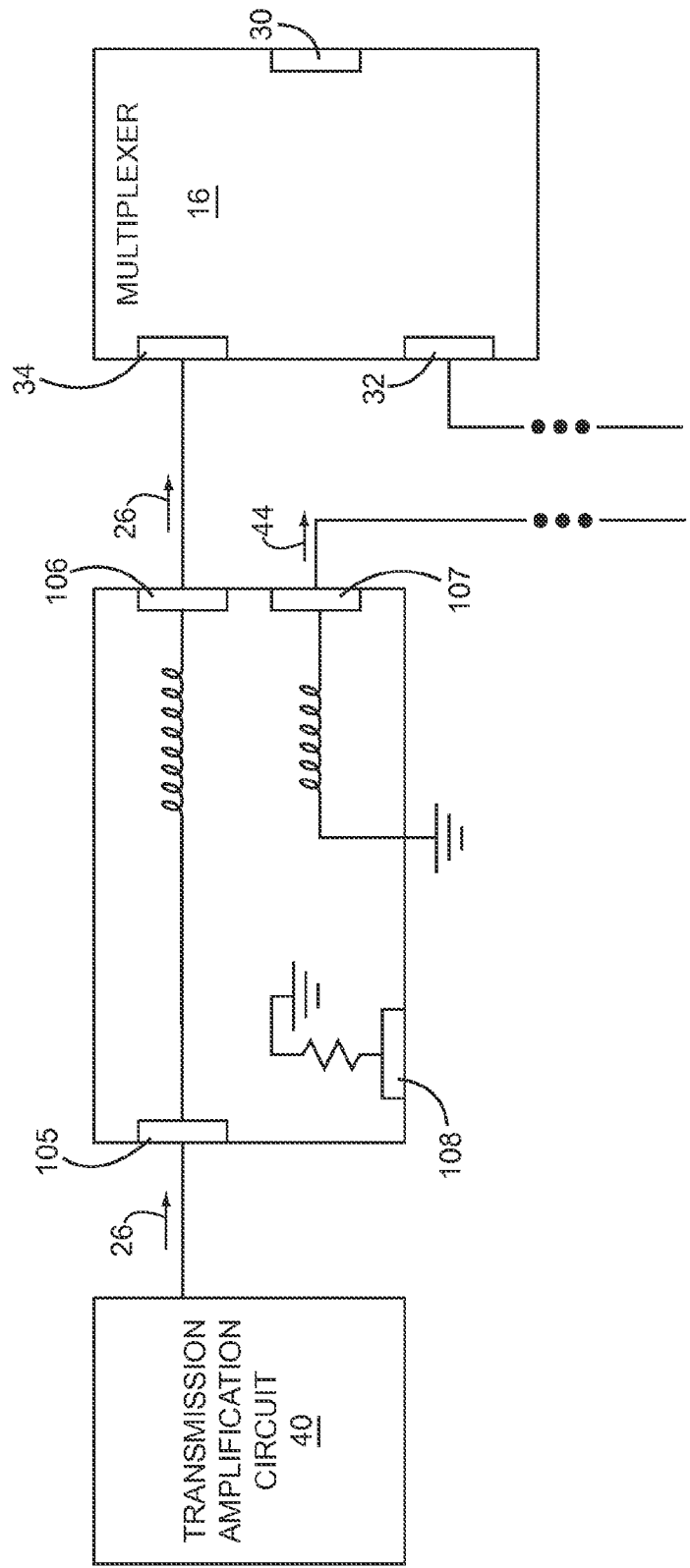
FIG. 1A illustrates one embodiment of a coupler provided in a transmitter circuit of the transceiver shown in FIG. 1.

Referring now to FIGS. 1 and 1A, FIG. 1A illustrates one embodiment of the coupler 42. The coupler 42 has a first coupler port 105, a second coupler port 106, a third coupler port 107, and a fourth coupler port 108. The first coupler port 105 is connected to the transmission amplification circuit 40 and receives the transmission signal 26 after being up converted by the transmitter circuit 18 into the physical uplink channel. Thus, the coupler 42 measures the forward power of the transmission signal 26 after amplification and within the physical uplink channel. The second coupler port 106 is connected to the second multiplexer port 32 of the multiplexer 16 so that the transmission signal 26 may be sent to the antenna 12 for transmission to a base station. To generate the transmit feedback signal 44, the second coupler port 106 is magnetically coupled to the third coupler port 107 thereby inducing a current in the third coupler port 107. In the illustrated embodiment, this current is the transmit feedback signal 44. Consequently, the signal level of the transmit feedback signal 44 is related to the current power level, in this case the forward power level, of the transmission signal 26. In this manner, the current power level of the transmission signal 26 may be detected. The fourth coupler port 108 may be isolated from the first coupler port 105, second coupler port 106, and the third coupler port 107.

Figure 2:
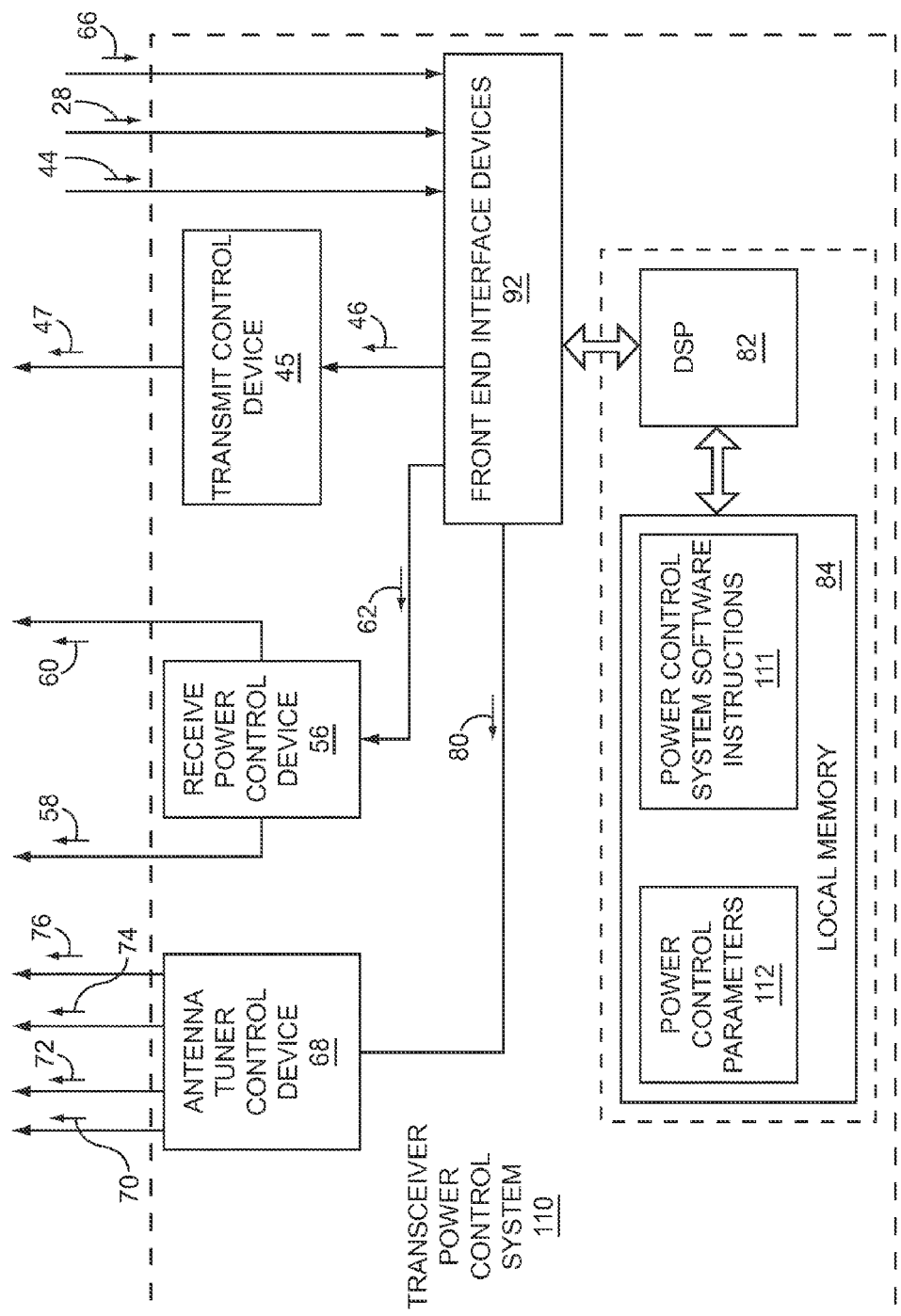
FIG. 2 illustrates one embodiment of a transceiver power control system.

Referring now to FIG. 1 and FIG. 2, FIG. 2 illustrates the components of the transceiver 10 from FIG. 1 that form a transceiver power control system 110 in accordance with this disclosure. The transceiver power control system 110 is operable to control the current power level of the transmission signal 26 and the current power level of the receive signal 28. The transceiver power control system 110 may include power control system software instructions 111 stored on the local memory 84, which when executed by the DSP 82 provide a transceiver power control software module that implements various functions of the transceiver power control system 110. Note that the transceiver power control software module may be mutually exclusive of the other software modules implemented by the DSP 82 or may be integrated or partially integrated with other software modules. The local memory 84 may also store power control parameters 112 that are executed by the DSP 82 to provide the transceiver power control software module, as described in further detail below. In the alternative, the power control system software instructions 111 and power control parameter 112 of the transceiver power control software module may also be stored on the local memory 88 for execution by the microprocessor 86.

Also, power control system software instructions 111 and power control parameter 112 may be stored on non-volatile memory devices 90, which may then be transferred to the local memory 84 and/or local memory 88. These power control system software instructions 111 and power control parameters 112 may have initially been received by the mobile user device 8, either through a communication network or through from other type of external non-transitory computer-readable medium, such as a CD, flash memory device, floppy disk, hard drive, or the like.

The transceiver power control system 110 shown in FIG. 2 includes the front end interface devices 92, the transmit power control device 45, the receive power control device 56, and the antenna tuner control device 68. The front end interface devices 92 may provide the receive signal 28, the transmit feedback signal 44, and the receive feedback signal 66 as input signals for the transceiver power control software module. The transceiver power control software module of the transceiver power control system 110 may also be operable to determine and generate, the transmission power control signal 46, the receive power control signal 62, and the antenna tuner control signal 80. In this manner, the transceiver power control system 110 can control the first adjustable gain of the transmission amplification circuit 40, the second adjustable gain of the receiver amplification circuit 54, and the pass band of the antenna tuner 14 and thereby control the current power levels of transmission signal 26 and the receive signal 28 within the transceiver 10.

Figure 3:
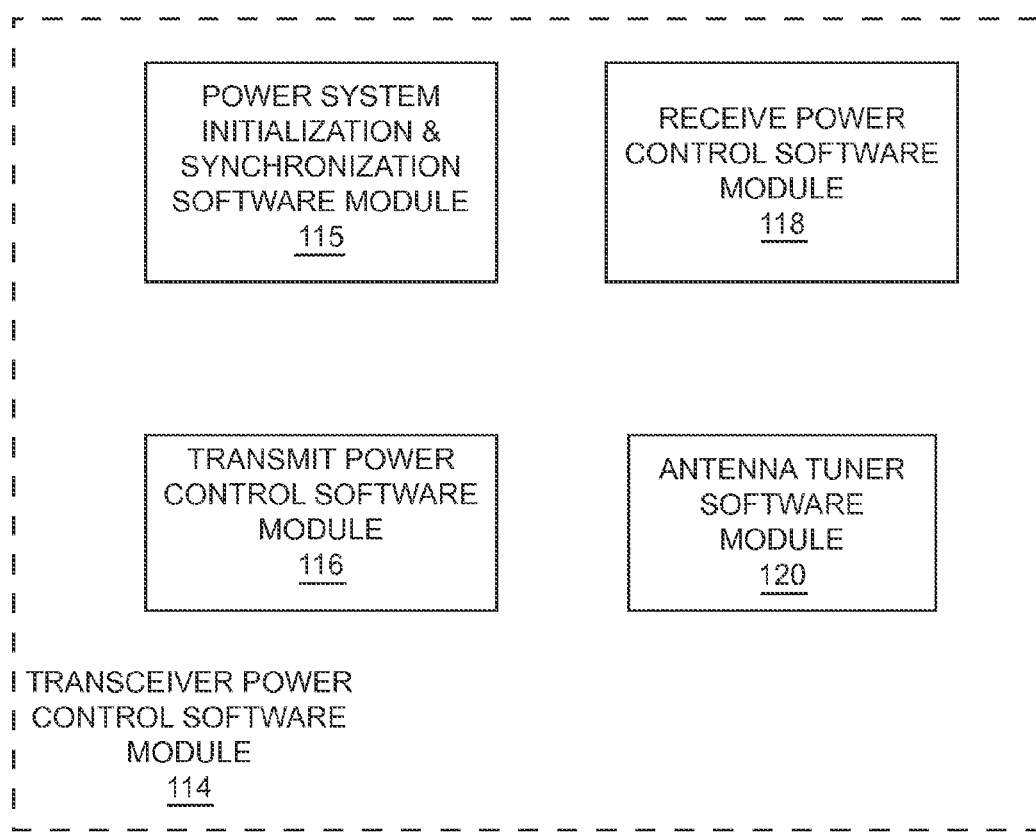
FIG. 3 illustrates one embodiment of a transceiver power control software module.

Referring now to FIG. 1 and FIG. 3, FIG. 3 illustrates a block diagram of a transceiver power control software module 114 in accordance with this disclosure. The transceiver power control software module 114 may include a power system initialization and synchronization software module (PSIS) 115 that provides initial power settings for the first adjustable gain of the transmission amplification circuit 40 and the second adjustable gain of the receiver amplification circuit 54. The PSIS 115 also allows the transceiver power control software module 114 to synchronize with a base station. The transceiver power control software module 114 may also include a transmit power control software module 116, a receive power control software module 118, and an antenna tuner software module 120. The transmit power control software module 116 determines and generates the transmission power control signal 46 to control the first adjustable gain of the transmission amplification circuit 40. The receive power control software module 118 generates the receive gain control signal 58 to control the second adjustable gain of the receiver amplification circuit 54. Finally, the antenna tuner software module 120 generates the antenna tuner control signal 80 to control the pass band of the antenna tuner 14.

FIGS. 2 and 3 illustrate the transceiver power control system 110 as a combination of a parallel transmission power control system that includes the transmit power control software module 116 and the transmit power control device 45, a parallel receive power control system that includes the receive power control software module 118 and the receive power control device 56, and a parallel antenna tuner control system having the antenna tuner software module 120 and the antenna tuner control device 68. The parallel transmission power control system, receive power control system, and antenna tuner control system together may communicate with one another and in combination provide the transceiver power control system 110.

In alternative embodiments of the transceiver power control system 110, some or all of the components of the transmission power control system, receive power control system, and antenna tuner control system may be integrated or at least partially integrated with one another. For example, the transmit power control software module 116, the receive power control software module 118, and the antenna tuner software module 120 may not be distinct software modules but instead may be formed or be part of an integrated software module that as a whole provides the transmit power control software module 116, the receive power control software module 118, and the antenna tuner software module 120. Similarly, the transmit power control device 45, the receive power control device 56, and the antenna tuner control device 68 are not necessarily parallel devices and may be provided as part of an integrated power control device. In yet another alternative, the transceiver power control system 110 may only include the transmission power control system, the receiver power control system, the antenna tuner control system, or some combination of one or two out of the three. In addition, the transceiver power control system 110 may be formed within or as part of another power control system in the mobile user device 8. In still yet another embodiment, the functionality of the transmit power control software module 116, the receive power control software module 118, and/or the antenna tuner software module 120 may be provided from one or more hardwired hardware circuits. These and other alternatives of the transceiver power control system 110 would be apparent to one of ordinary skill in the art in light of this disclosure and are considered within the scope of this disclosure.

Figure 4:
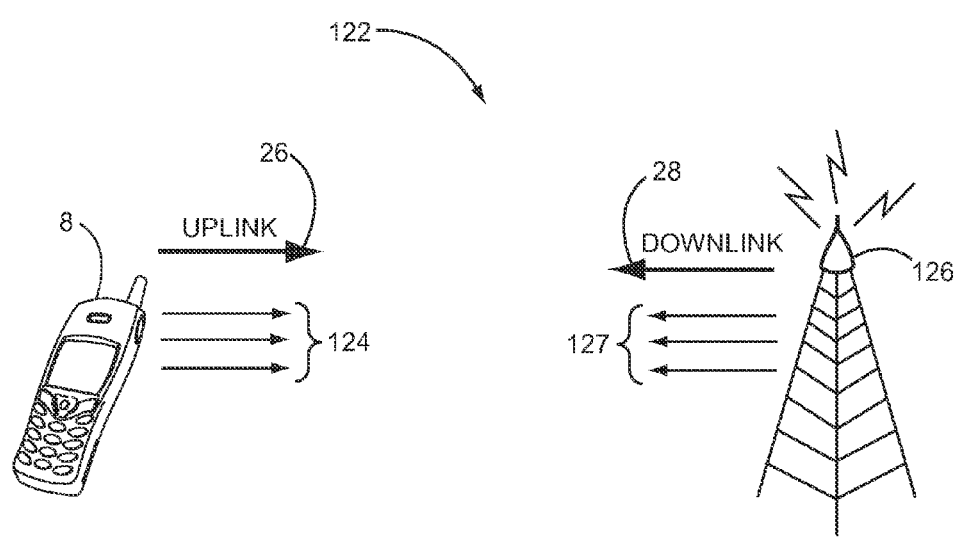
FIG. 4 illustrates one embodiment of a communication system having a mobile user device and a base station.

FIG. 4 illustrates one embodiment of a communication system 122 for a mobile user device 8, in this case a cell phone, having a transceiver 10 with the transceiver power control system 110 as described above in FIG. 1-3. In the communication system 122, the mobile user device 8 communicates with a base station 126. For example, the base station 126 may be an eNodeB base station that provides 3G and/or 4G services. The term "uplink" refers to a direction of communication from the mobile user device 8 to the base station 126. In contrast, the term "downlink" refers to a direction of communication from the base station 126 to the mobile user device 8. The transmission signal 26 is thus an uplink signal since the transmission signal 26 is transmitted from the mobile user device 8 to the base station 126. In contrast, the receive signal 28 is a downlink signal since the receive signal 28 is transmitted from the base station 126 to the mobile user device 8.

The transmission signal 26 is provided with the physical uplink channel to the base station 126. The physical uplink channel is defined by a transmission frequency. The transmission signal 26 transmitted within the physical uplink channel from the mobile user device 8 to the base station 126. As discussed above, the physical uplink channel may also be associated with a scrambling code, channel code, start and stop time, phase (0 or $$\frac{\pi}{2}$$

radians for in-phase and quadrature phase signals received separately), a specific orthogonal signature sequence, and/or the like. The physical uplink channel may thus be utilized to transmit information for one or more 3G or 4G services to the base station 126. Various other uplink transmission signals 124 may be transmitted from the mobile user device 8 within different physical uplink channels, each being defined by a different transmission frequency.

Similarly, the receive signal 28 is transmitted via a physical downlink channel to the base station 126. The physical downlink channel is defined by a receive frequency. The receive signal 28 is transmitted within the physical downlink channel from the mobile user device 8 to the base station 126. As discussed above, the physical downlink channel may also be associated with a scrambling code, channel code, start and stop time, phase (0 or $$\frac{\pi}{2}$$

radians for in-phase and quadrature phase signals received separately), a specific orthogonal signature sequence, and/or the like. The physical downlink channel may thus be utilized to transmit information for one or more 3G or 4G services to the mobile device 8. Various other downlink receive signals 127 may be transmitted from the base station 126 via different physical downlink channels.

The specifications for the format of the transmission signal 26 and the receive signal 28 may be defined by the specifications of the physical uplink channel and the physical downlink channel. The physical uplink channel and the physical downlink channel may be included as part of a transport channel for one or more 3G or 4G services. Thus, the physical uplink channel and physical downlink channel may have specifications that allow the transport channel to provide a particular 3G or 4G service.

Figure 5:
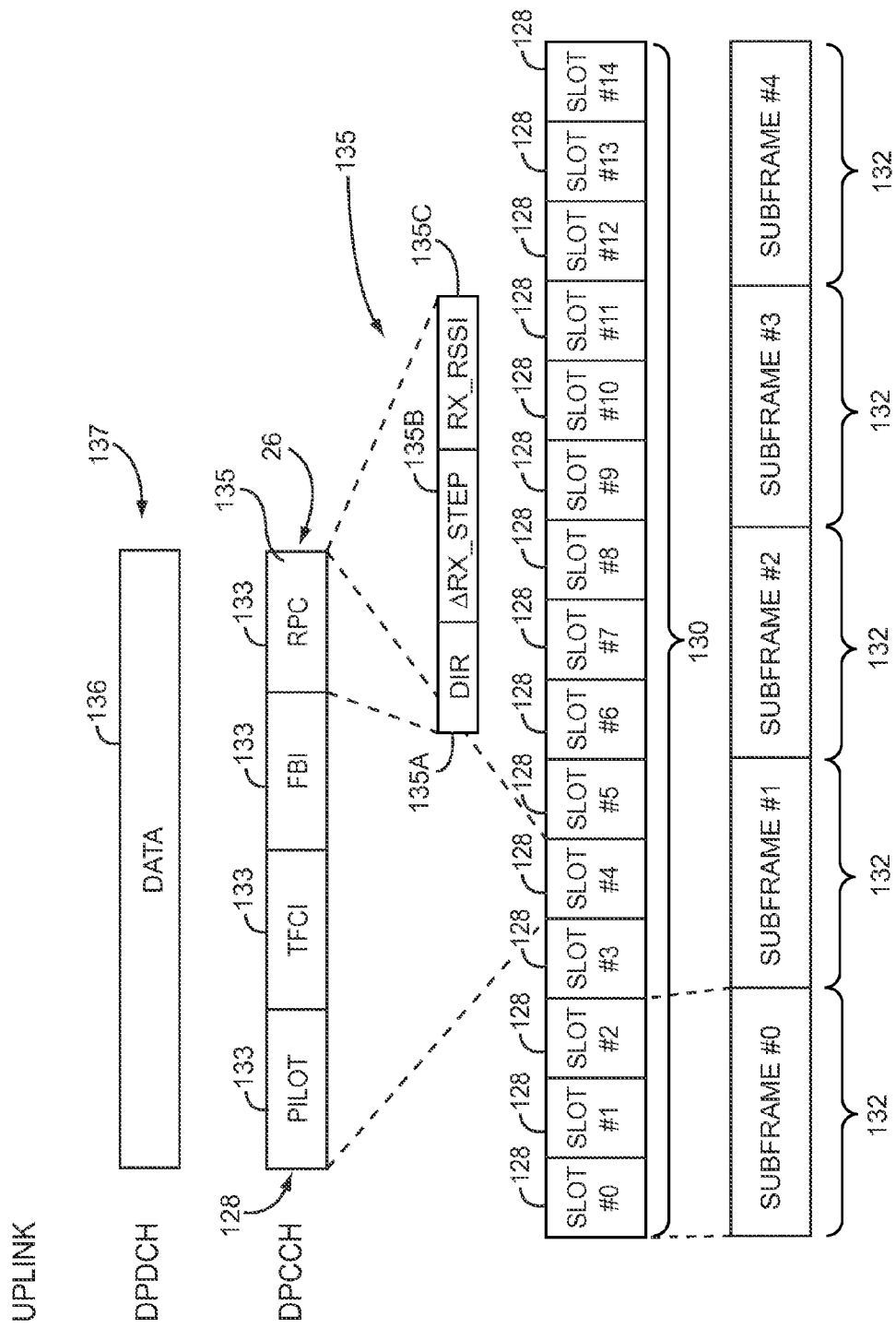
FIG. 5 illustrates one embodiment of a data element for one type of transmission signal.

Referring now to FIG. 1 and FIG. 5, FIG. 5 illustrates one embodiment of a data element of the transmission signal 26 transmitted within the physical uplink channel. The transmission signal 26 has a format that follows the specifications of the physical uplink channel. In this case, the physical uplink channel is an uplink dedicated physical control channel (UD-PCCH). The data element shown in FIG. 5 may be referred to as a slot 128, which is part of a larger data element of the transmission signal 26 that may be referred to as a data frame 130. The data frame 130 includes fifteen (15) slots 128 and may be 40960 chips in length and have a time period of approximately 10 microseconds. A stream of data frames 130 may be transmitted by the transmission signal 26 in accordance to the timing and/or encoding specifications of the physical uplink channel. Accordingly, these slots 128 may be 2560 chips in length and have a time period of approximately $$\frac{10}{16}$$

microseconds. These slots 128 may be grouped into other data elements such as sub-frames 132. In this case, the sub-frame 132 has a length and time period of five (5) slots 128. Each slot 128 includes data fields 133 carrying information, in this case control information.

One of these data fields 133 is a RPC field 135 that includes receive power control (RPC) information related to adjusting a current power level of the receive signal 28 to a first desired power level. The RPC field 135 may include direction information 135A defining a direction of power change, power step information 135B defining a magnitude of power change, and current power information 135C indicating the current power level of the receive signal 28.

For example, the direction information 135A may be one (1) if the current power level of the receive signal 28 is to be increased and zero (0) if the current power level of the receive signal 28 is to be decreased. Thus, the RPC information has a RPC command when the RPC information indicates a change in the current power level. The RPC field 135 may be provided in a specific configuration if there is no change in the current power level and thus has no RPC command for a current receive power adjustment time period. The RPC field 135 may be provided with certain bits in a particular configuration if there is no RPC command. In the alternative, the direction information 135A may be negative one (−1) if the current power level of the receive signal 28 is to be decreased, positive one (+1) if the current power level of the receive signal 28 is to be increased. Thus, the direction information 135A indicates that there is a RPC command when the direction information 135A is either a negative one (−1) or a positive one (+1). The direction information may be zero (0) if the current power level of the receive signal 28 is to remain unchanged and thus indicates that there is no RPC command. Next, the power step information 135B may be any type of power step value, such as, 0.5 dB, 1 dB, 1.5 dB, or 2 dB. The current power information 135C may be a measurement of the current power level of the receive signal 28 either from the receive signal 28 itself or from the receive feedback signal 66. The current power information 135C may include parameters such as receive signal strength indicator (RSSI), received signal channel power (RSCP), or the like, which are based on the signal level of the receive signal 28 or the receive feedback signal 66.

The RPC information may be transmitted (shown in FIG. 4) to request increases or decreases to the current power level of the receive signal 28 by the base station 126. As explained in further detail below, RPC information may also be used internally by the transceiver 10 of the mobile user device 8 to adjust the current power level of the receive signal 28. FIG. 5 also shows a slot 136 of another uplink transmission signal 137 transmitted along another physical uplink channel, which in this case is an uplink dedicated physical data channel (UDPDCH). The slot 136 is associated with one of the slots 128 and is for data transmission. Accordingly, the UDPCCH is utilized to transmit uplink control information and the UDPDCH is utilized to transmit uplink data for a particular transport channel. While the physical uplink channel is described as UDPCCH, the physical uplink channel may be any type of uplink physical channel including the UDPDCH. In addition, the physical uplink channel may be an uplink enhanced dedicated physical control channel (UE-DPCCH), an uplink common control channel (UCCCH), an uplink high speed dedicated physical control channel (UHS-DPCCH), an uplink physical random access channel (UPRACH), or any data channel associated with these channels, and the like.

Figure 6:
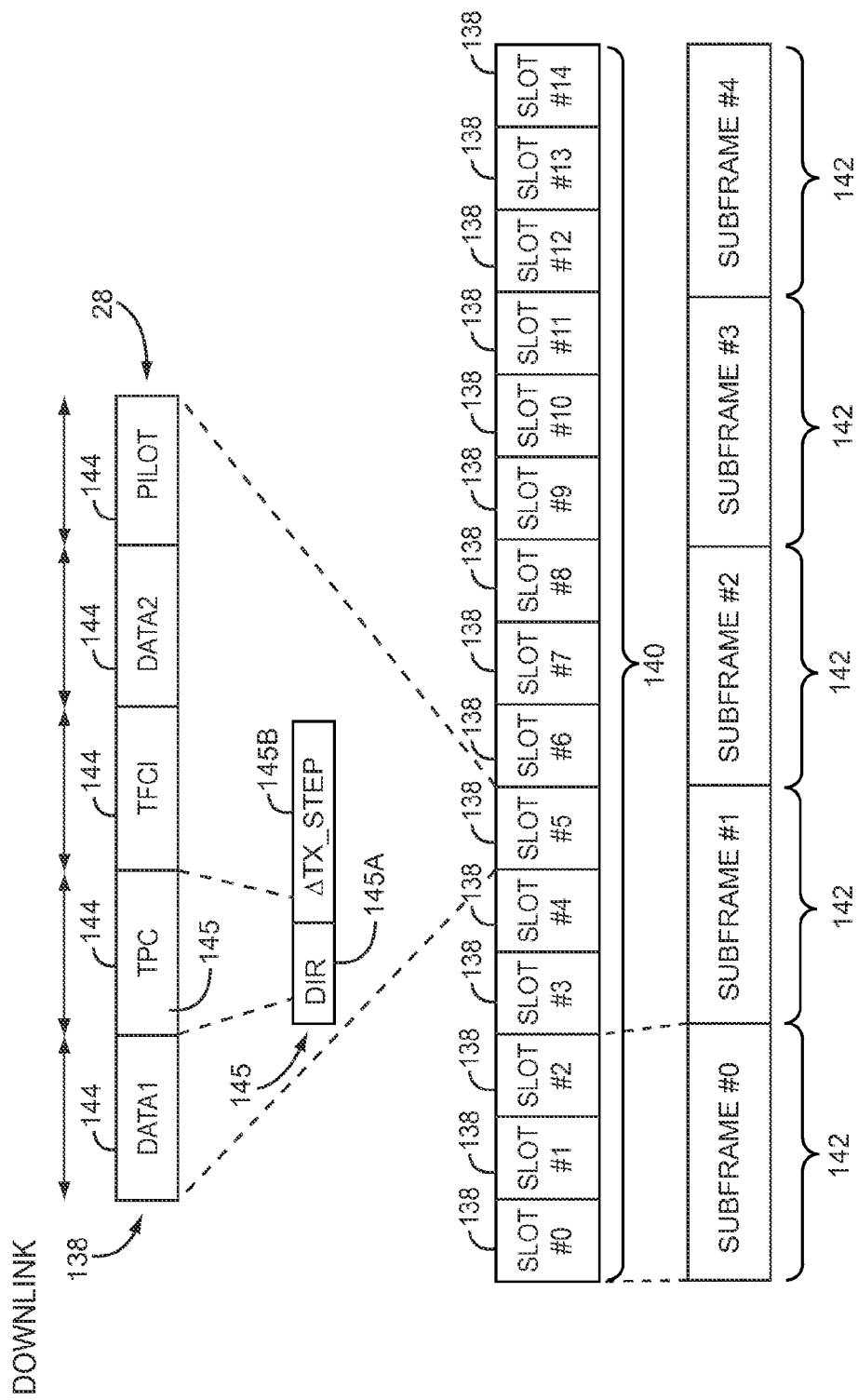
FIG. 6 illustrates one embodiment of a data element for one type of receive signal.

Referring now to FIG. 1 and FIG. 6, FIG. 6 shows a data element of the receive signal 28 transmitted within the physical downlink channel. In this case, the physical downlink channel is a downlink dedicated physical channel (DDPCH). The receive signal 28 has a format that follows the specifications of the physical uplink channel. The data element may be referred to as a slot 138, which is part of a larger data element of the receive signal 28 that may be referred to as a data frame 140. The data frame 140 includes fifteen (15) of the slots 138 and may be 40960 chips in length and have a time period of approximately 10 microseconds. Accordingly, these slots 138 may be 2560 chips in length and have a time period of approximately microseconds. These slots 138 may be grouped into other data elements such as sub-frames 142. In this case, the sub-frame 142 has a length and time period of three (3) slots 138. Each slot 138 includes data fields 144 carrying different types of information, in this case both control information and data. One of these data fields 144 is a TPC field 145 that includes transmit power control (TPC) information. TPC information may be sent by the base station 126 to the mobile user device 8 to request changes in the current power level of the transmission signal 26 by the mobile user device 8. The TPC field 145 may include TPC information such as direction information 145A defining a direction of power change and power step information 145B defining a magnitude of power change. Current power information indicating the current power level of the transmission signal 26 as measured from the base station 126 (shown in FIG. 4) may also be included.

For example, the direction information 145A may be one (1) if the current power level of the transmission signal 26 is to be increased and zero (0) if the current power level of the transmission signal 26 is to be decreased. Thus, the TPC information has a TPC command when the TPC information indicates a change in the current power level. The TPC field 145 may be provided in a specific configuration if there is no change in the current power level and thus has no TPC command for a particular transmit power adjustment time period or the TPC field 145 may be provided with certain bits in a particular configuration if there is no TPC command. In the alternative, the direction information 145A may be negative one (−1) if the current power level of the transmission signal 26 is to be decreased, positive one (+1) if the current power level of the transmission signal 26 is to be increased. Thus, the direction information 145A indicates that there is a TPC command when the direction information 145A is either a negative one (−1) or a positive one (+1). The direction information may be zero (0) if the current power level of the transmission signal 26 is to remain unchanged and thus indicates that there is no TPC command. The power step information 145B may be any type of power step value, such as, 0.5 dB, 1 dB, 1.5 dB, or 2 dB. In addition, other types of information may be included in the TPC information, such as parameters that the current power level of the transmission signal 126 as measured by the base station 126.

The TPC information is transmitted from the base station 126 (shown in FIG. 4) to the mobile user device 8 (shown in FIG. 4) so that the mobile user device 8 can increase or decrease the current power level of the transmission signal 26 to a first desired power level. While the physical downlink channel for this embodiment is the DDPCH, any physical downlink channel that provides TPC information or any physical downlink channel capable of being configured to provide TPC information may be utilized. Thus, the physical downlink channel may also be a downlink enhanced dedicated physical channel DE-DPCH), a downlink fractional dedicated physical channel (DF-DPCH), a downlink enhanced dedicated relative grant channel (DE-RGCH), a downlink enhanced hybrid indicator channel (DE-HICH), a downlink physical random access channel (DDPRACH), a downlink primary common control physical channel (DP-CCPCH), a downlink secondary common control physical channel (DS-CCPCH), and a downlink high speed shared control physical channel (DHS-DSCH), or the like.

Figure 7:
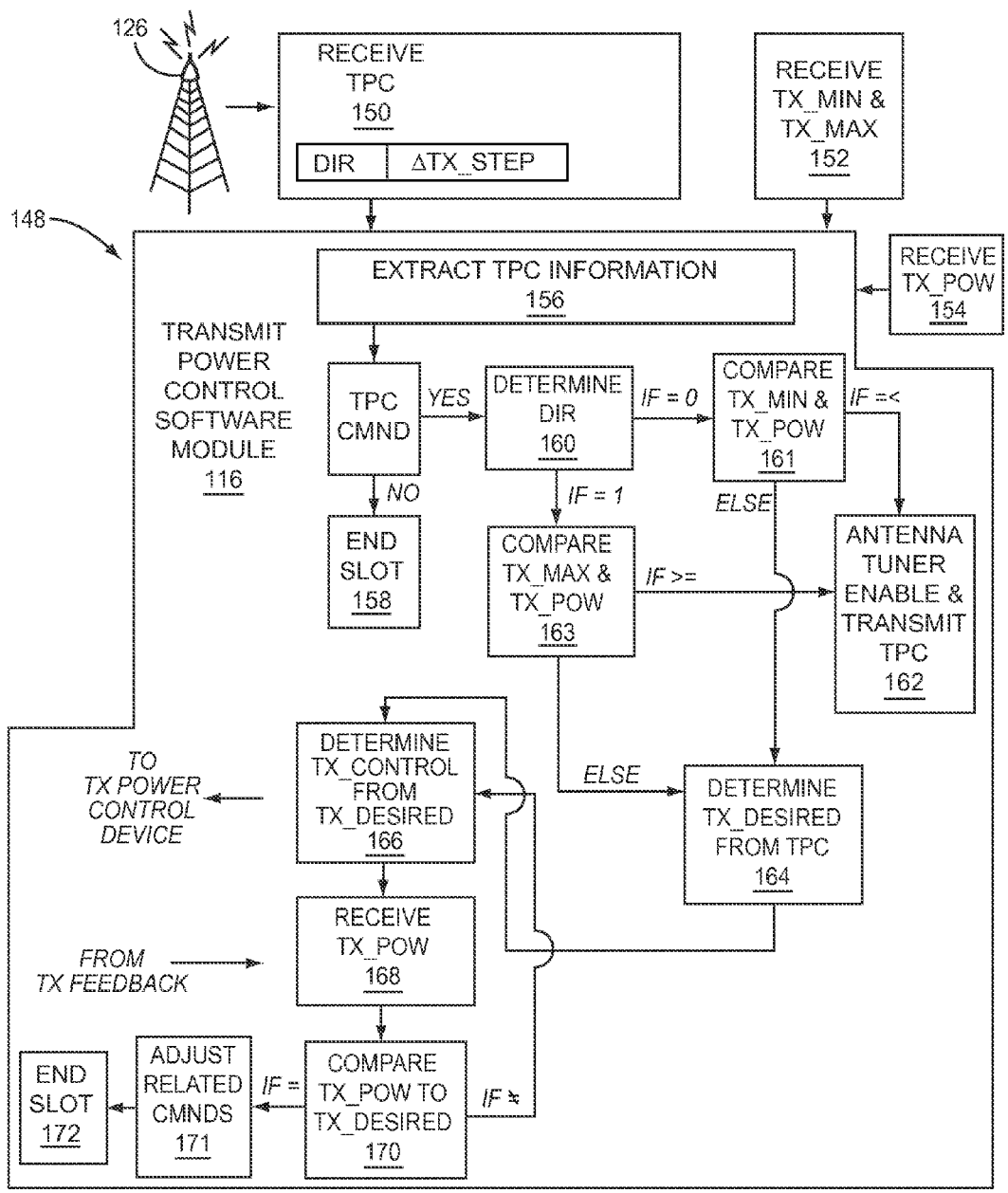
FIG. 7 illustrates one embodiment of a power control process implemented by a transmit power control software module.

Referring now to FIGS. 1 and 5-7, FIG. 7 illustrates a transmit power control process 148 implemented by the transmit power control software module 116 shown in FIG. 3. Note that the diagram in FIG. 7 is simply one embodiment of the transmit power control software module 116 and the steps described are not necessarily to be performed in any particular order and different or alternate steps may be performed in accordance to the operating mode of the mobile user device 8. Furthermore, the transmit power control software module 116 described in FIG. 7 assumes that the mobile user device 8 has been synchronized with the base station and is operating in the normal mode. If synchronization has not yet been achieved or upon initially synchronizing the mobile user device 8 to the base station, different or alternate steps that include different calculations utilizing pilot bits and the like may be needed. Also, note that the steps described in FIG. 7 may be performed for each transmit power adjustment time period, which in this case is defined and synchronized in accordance with the slot 128 of the transmission signal 26. Thus, the transmit power adjustment time period may be defined by a time period of the slot 128 and thus may be the time period of the slot 128 itself (such as $$\frac{10}{16}$$

microseconds) or some fraction of the time period for the slot 128 (such as $$\frac{5}{16}$$

microseconds). In the alternative, if the mobile user device 8 is in a different operating mode, the transmit power adjustment time period may group the slots 128 into the sub-frames 132, and the transmit power adjustment time period may be defined by the time period associated with the sub-frames 132. The transmit power adjustment time period may also be defined by the time period of the data frame 130 or in yet another alternative, the transmit power adjustment time period may be defined by one of the time periods of the data elements described in FIG. 6 for the receive signal 28. Thus, the transmit power adjustment time period may be defined by either the physical uplink channel or the physical downlink channel.

The transmit power control software module 116 operates to control the first adjustable gain of the transmission amplification circuit 40 so that the current power level of the transmission signal 26 and thus the physical uplink channel is adjusted to a first desired transmission power level. The process begins by receiving TPC information in the receive signal 28 transmitted within the physical downlink channel from the base station 126 (step 150). Also, parameters TX_MIN and TX_MAX are received by the transmit power control software module 116 (step 152). Parameters TX_MIN and TX_MAX do not have to be received for each transmit power adjustment time period and may simply be stored as power control parameters in local memory 84. The parameters TX_MIN and TX_MAX indicate the minimum and maximum power levels, respectively, for the transmission signal 26 that may be provided by the transmission signal 26.

Also received is a parameter TX_POW which indicates the current power level of the transmission signal 26 and is based on the signal level of the transmit feedback signal 44 (step 154). Thus the transmit feedback signal 44 allows the transmit power control software module 116 to detect the current power level of the transmission signal 26. Next, the TPC information is extracted from one of the slots 138 of the receive signal 28 which has been associated with the one of the slots 128 of the transmission signal 26 being processed during the current transmit power adjustment time period (step 156). If the TPC information indicates that there is no TPC command then the transmit power control software module 116 may end for the current transmit power adjustment time period (step 158). On the other hand, if the TPC information does include a TPC command, then the transmit power control module determines if the direction information is requesting an increase or a decrease in the current power level of the transmission signal 26 (step 160). If the direction information requests a decrease in the current power level of the transmission signal 26, and thus is for example a zero (0), then the transmit power control software module 116 compares the parameter TX_POW with TX_MIN to determine if the current power level of the transmission signal 26 is at the minimum power level (step 161). If TX_POW is equal to or less than TX_MIN, this indicates that the current power level of the transmission signal 26 cannot be lowered any more by the first adjustable gain of the transmission amplification circuit 40 and the transmit power control software module 116 ends by sending an enabling signal to enable changes by the antenna tuner 14 and by transmitting the TPC information to the antenna tuner control system (step 162). If the direction information requests an increase in the current power level of the transmission signal 26, and thus is for example a one (1), then the transmit power control software module 116 compares the parameter TX_POW with TX_MAX to determine if the current power level of the transmission signal 26 is at the maximum power level (step 163). If TX_POW is equal to or greater than TX_MAX, this indicates that the current power level of the transmission signal 26 cannot be raised any more by the first adjustable gain of the transmission amplification circuit 40 and the transmit power control software module 116 ends by sending an enabling signal to enable changes by the antenna tuner 14 and by transmitting the TPC information to the antenna tuner control system (step 162).

If TX_POW indicates that the current power level of the transmission signal 26 is within the power limits that can be provided by the first adjustable gain of the transmission amplification circuit 40, then the transmit power control software module 116 determines a value of the first desired transmission power level for the transmission signal 26 based on the TPC information (step 164). For example, if the transmit power adjustment time period is synchronized with each of the slots 128 (shown in FIG. 5), then the first desired transmission power level may be expressed as:

$$P_{DesiredT}(k) = P_{TX\_POW}(k) + \Delta step(k) * Dir(k)$$

Where $P_{DesiredT}(k)$ is the first desired transmission power level, $P_{TX\_POW}(k)$ is the current power level of the transmission signal 26 as indicated by TX_POW, $\Delta step(k)$ is the magnitude of power change indicated by the power step information, Dir(k) is the direction of the power change indicated by the direction information, and k is an integer indicating a particular slot 128. If in the alternative the mobile user device is in a soft handover mode, as it transitions from being synchronized with one base station to another base station, then the transmit power control software module 116 must deal with TPC information from more than one base station. Soft symbol decisions of the TPC information from each of the different base stations may be combined to derive a combined TPC command.

In the alternative, other algorithms may be utilized which are synchronized with sub-frames 132 or data frames 130. In this case, the transmit power control system module may select the power step information for one of the slots 132 in the sub-frame 132 or data frame 130 or combine the power step information by averaging and the like. In addition, a hard decision based on the direction information of each, some, or all of the slots 128 in the sub-frame 132 or data frame 130 may be utilized to determine a direction of change. Finally to calculate $P_{DesiredT}(k)$ other parameters may be added or subtracted to the equation indicated above for different operating modes. For example, if the mobile user device is operating in a compressed mode then an additional parameter may be added to $P_{DesiredT}(k)$ in accordance with pilot information. These and other calculations of the first desired transmission power level and parameters for calculating the first desired transmission power level would be apparent to one of ordinary skill in the art in light of this disclosure and are considered within the scope of the disclosure.

Upon calculating the first desired transmission power level of the transmission signal 26, the transmit power control software module 116 determines TX_Control which indicates a value or values to be transmitted on the transmission power control signal 46, and the transmit power control software module 116 generates the transmission power control signal 46 accordingly (step 166). The value or values transmitted on the transmission power control signal 46 may be related to a gain level of the first adjustable gain of the transmission amplification circuit 40 to provide the first adjustable gain at the first desired transmission power level. In this manner, the transmission power control signal 46 may be transmitted to the transmit power control device 45 to adjusts the first adjustable gain of the transmission amplification circuit 40 and reduce a difference between the current power level of the transmission signal 26 and the first desired transmission power level of the transmission signal 26.

Ideally, this adjustment of the first adjustable gain eliminates the difference between the current power level of the transmission signal 26 and the first desired transmission power level but this may not be the case. However, the coupler 42 is connected within the transmitter circuit 18 and thus the transmit power control software module 116 can detect the forward power of the transmission signal 26 caused by the adjustment of the first adjustable gain. Accordingly, the transmit power control software module 116 again receives the parameter TX_POW which now indicates the new current power level of the transmission signal 26 based on the signal level of the transmit feedback signal 44 (step 168). The new TX_POW is compared to the first desired transmission power level of the transmission signal 26 (step 170). If the comparison indicates that the current power level is not equal to the first desired transmission power level, then the difference between the first desired transmission power level and the current power level, while reduced has not been eliminated. Accordingly, steps 166-170 are repeated continuously so long as the difference between the first desired transmission power level and the current power level has not been eliminated or until the time that the current transmit power adjustment time period ends. Consequently, the power loop for the transmission signal 26 can be closed internally without requiring a base station to determine if the changes in forward power were made accurately by the transceiver 10.

For the steps 150-162 described in FIG. 7, the physical uplink channel is the UDPCCH, which is a type of physical uplink logical channel. If the mobile user device 8 is not in the normal mode, other channels may be utilized such as the UCCCH with alternate algorithms. Also, as discussed above, the transceiver 10 may generate and transmit a plurality of transmission signals within different physical uplink channels on the antenna 12. For example, transmission signals may be transmitted between physical uplink channels including, but not limited to, a UDPDCH, UCCCH, UE-DPCCH, a UHS-DPCCH, an UPRACH, other types of physical uplink logical channels or any physical uplink data channel associated with these channels, and the like. The transmitter circuit 18 may include a plurality of parallel transmitter chains or partially parallel transmitter chains to up convert the transmission signals into their respective physical uplink channels. The multiplexer 16, the first multiplexer port 30 and/or the second multiplexer port 32 may include a switch or switches that coordinate the traffic among all of the transmission signals.

Accordingly, the parallel or partially parallel transmitter chains may each have a transmission amplification circuit with an adjustable gain and each of these may be controlled by other transmission power control signals generated by the DSP and associated with the respective amplification circuit the particular physical uplink channels. For each of the transmitter chains, the transmit power control software module 116 may have parallel processes similar to those described in steps 150-170 of FIG. 7 to control the current power level of the different transmission signals. However, providing a parallel process for each transmission chain takes up processing resources and presents computing inefficiencies. Thus, instead of providing a parallel process for each physical uplink channel, relationships may be determined between the first adjustable gain of the transmission amplification circuit 40 and the adjustable gains for the transmission amplification circuits associated with the other transmission signals and physical uplink channels. The transmit power control software module 116 may adjust the adjustable gains of the transmission amplification circuits in the other physical uplink channels based on the relationships (step 171).

For example, the nominal power relation between the first adjustable gain of the transmission amplification circuit 40 and the adjustable gain of the amplification circuit for the transmitter chain of the UDPDCH may be expressed as:

$$A = \frac{\beta_{UDPCCH}}{\beta_{UDPDCH}}$$

Where $\beta_{UDPCCH}$ represents the first adjustable gain, $\beta_{UDPDCH}$ represents the adjustable gain of the amplification circuit for the UDPDCH, and the parameter A is a proportion between $\beta_{UDPCCH}$ and $\beta_{UDPDCH}$. This relationship in this case is linear and assumes that the transceiver 10 is operating in a normal mode. In other modes, for example when operating in the compressed mode, the relationship may be adjusted in accordance to various factors such as parameters calculated based on pilot bits. The relationship between the UDPCCH and other channels may be various and have different types of linear or nonlinear relationships. Similarly, if in alternative embodiments, steps 150-171 are utilized with a channel other than the UDPCCH, the relationships between this other channel and additional physical uplink channels may have different linear or nonlinear relationships. One of ordinary skill in the art would know how to determine these relationships in light of this disclosure.

After the current power level of the physical uplink channels have been adjusted as discussed above in step 171, the transmit power control software module 116 ends the process for the particular slot 128 (step 172). The transceiver 10 may then begin processing the next slot 128 that is associated with the TPC information of the next slot 138 of the receive signal 28. The TPC information of the next slot 138 may include TPC information for adjusting the current power level of the transmission signal 26 to a second desired transmission power level. Then steps 150, 154-172 may be repeated during the transmit power adjustment time period of the next slot 128. The subsequent slots 128 may each be associated with the TPC information of one of the subsequent slots 138 in the receive signal 28. This TPC information of the subsequent slot 138 may be for adjusting the current power level to another desired transmission power levels, and the transmit power control process 148 may be repeated continuously so long as the information stream of the transmission signal 26 and the receive signal 28 are maintained between the mobile user device 8 and the base station.

Figure 8:
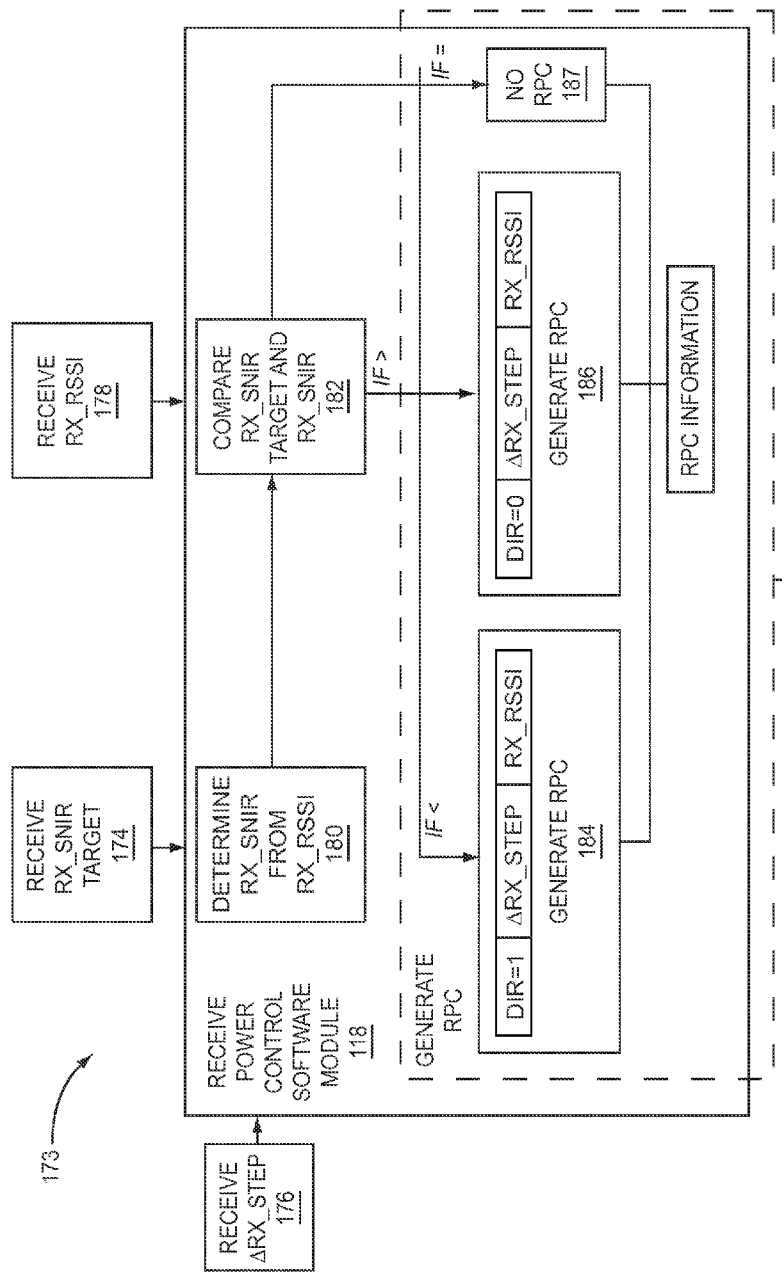
FIG. 8 illustrates one embodiment of a receive power control information generation process implemented by a receive power control software module.

Referring now to FIGS. 1, 5, 6, and 8, FIG. 8 illustrates a diagram of steps executed by a RCP information generation process 173 of the receive power control software module 118, which generates RCP information. Note that the diagram in FIG. 8 is simply one embodiment and the steps described are not necessarily to be performed in any particular order and different or alternate steps may be performed in accordance to the operating mode of the mobile user device 8. Furthermore, the receive power control software module 118 described in FIG. 8 assumes that the mobile user device 8 has been synchronized with the base station and is operating in the normal mode. If synchronization has not yet been achieved or upon initially synchronizing the mobile user device 8 to the base station, different or alternate steps that include different calculations utilizing pilot bits and the like may be needed. Also, note that the steps described in FIG. 8 may be performed for each receive power adjustment time period, which in this case is defined and synchronized in accordance with the slot 128 (shown in FIG. 5) of the transmission signal 26. Thus, the receive power adjustment time period may be defined by a time period of the slot 128 and thus may be the time period of the slot 128 itself (such as $$\frac{10}{16}$$

microseconds) or some fraction of the time period for the slot 128. In the alternative, for example if the mobile user device 8 is in an alternate operating mode, the receive power adjustment time period may group the slots 128 into the sub-frames 132 (shown in FIG. 5), and the receive power adjustment time period may be defined by the time period associated with the sub-frames 132. Accordingly, the receive power adjustment time period may be the same as and synchronized with the transmit power adjustment time period. Alternatively, the receive power adjustment time period may also be defined by the time period of the data frame 130 (shown in FIG. 5) or in yet another alternative, the receive power adjustment time period may be defined by one of the time periods of the data elements described in FIG. 6 for the receive signal 28. Thus, the receive power adjustment time period may be defined by either the physical uplink channel or the physical downlink channel.

The RCP information generation process 173 begins by receiving a parameter (RX_SNIR_TARGET) indicating a target receive signal to noise ratio for the receive signal 28 (step 174). This RX_SNIR_TARGET may be stored as one of the power control parameters in the local memory 84 or may be determined and provided by an ancillary or external process of the transceiver 10. RX_SNIR_TARGET may or may not be received for each receive power adjustment time period. Note that the receive power control software module 118 may require the execution of several RPC commands to be able to reach the RX_SNIR_TARGET and RX_SNIR_TARGET may also be based on the particular operation mode of the mobile user device 8.

Next, power step information indicating a desired power change step is received (step 176). The power step information may also be stored as one of the power control parameters in local memory 84 or may be determined and provided by an ancillary or external process of the transceiver 10. The power step information may or may not be received for each receive power adjustment time period. Also, the receive power control software module 118 receives a parameter, RX_RSSI, which indicates the current power level of the receive signal 28 (step 178). RX_RSSI is a measurement of the RSSI of the receive signal 28. In the alternative, RSCP along with any other value that indicates the current power level of the receive signal 28 may be utilized. RX_RSSI may be determined by the DSP 82 by processing the receive signal 28 or alternatively based on the signal level of the receive feedback signal 66.

Next, the receive power control software module 118 determines a parameter RX_SNIR from RX_RSSI, which indicates the current receive signal to noise ratio of the receive signal 28 (step 180). The receive power control software module 118 compares RX_SNIR_TARGET and RX_SNIR to determine if the current receive signal to noise ration of the receive signal 28 is at the desired level (step 182). If the signal to noise ratio is less than required, then the receive power control software module 118 generates RPC information with directional information requesting an increase of the current power level of the receive signal 28, power step information indicating a desired magnitude of change, and RX_RSSI (step 184). On the other hand, if the current signal to noise ratio is greater than required, then the receive power control software module 118 generates RPC information with directional information requesting a decrease of the current power level of the receive signal 28, the power step information, and RX_RSSI (step 186). In the alternative, if the current signal to noise ratio is greater than required, the RPC information may be provided in a manner that indicates that there is no RPC command for the receive power control power adjustment time period. If the RX_SNIR_TARGER and RX_SNIR are substantially equal, the current power level of the receive signal 28 is to remain the same and the RPC information indicates that there is no RPC command (step 187).

The RPC information may be included in the transmission signal 26 (as shown in FIG. 5) to request an adjustment to the current power level of the receive signal 28 from the base station. In addition, the RPC information may be utilized internally to adjust the current power level of the receive signal 28. If the RPC command requested by the RPC information can be carried out internally by the receive power control software module 118, the RPC commands may not be sent to the base station but rather RPC information may be sent to the base station indicating that there is no RPC command.

Referring now to FIG. 1 and FIGS. 5, 6, and 9, FIG. 9 illustrates a diagram of steps of a receive power control process 188 executed by the receive power control software module 118. During the receive power control process 188, the receive power control software module 118 operates to control the second adjustable gain of the receiver amplification circuit 54 so that the current power level of the receive signal 28 is adjusted to a first desired receive power level. The receive power control process 188 may utilize the RPC information generated as discussed above in FIG. 8. Initially, parameters RX_MIN and RX_MAX are received by the receive power control software module 118 (step 190). Parameters RX_MIN and RX_MAX do not have to be received for each receive power adjustment time period and may simply be stored as power control parameters in local memory 84 or determined and provided by an ancillary or external process. The parameters RX_MIN and RX_MAX indicate the minimum and maximum power levels, respectively, for the receive signal 28 that may be provided by the receiver amplification circuit 54 for the receive signal 28.

Next, the RPC information is extracted (step 192). If the RPC information indicates that there is no RPC command then the receive power control software module 118 may end for the receive power adjustment time period (step 194). On the other hand, if the RPC information does include a RPC command, then the transmit power control module determines if the direction information is requesting an increase or a decrease in the current power level of the receive signal 28 (step 196). If the direction information requests a decrease in the current power level of the receive signal 28, and thus is for example a zero (0), then the receive power control software module 118 compares the parameter RX_RSSI with RX_MIN to determine if the current power level of the receive signal 28 is at the minimum power level (step 197). If RX_RSSI is equal to or less than RX_MIN, this indicates that the current power level of the receive signal 28 cannot be lowered any more by the second adjustable gain of the receiver amplification circuit 54 and the receive power control software module 118 ends by sending an enabling signal to enable changes to the pass band of the antenna tuner and by transmitting the RPC information to the antenna tuner control system (step 198). If the direction information requests an increase in the current power level of the receive signal 28, and thus is for example a one (1), then the receive power control software module 118 compares the parameter RX_RSSI with RX_MAX to determine if the current power level of the receive signal 28 is at the maximum power level (step 199). If RX_RSSI is equal to or greater than RX_MAX, this indicates that the current power level of the receive signal 28 cannot be raised any more by the second adjustable gain of the receiver amplification circuit 54 and the receive power control software module 118 ends by sending an enabling signal to enable changes to the pass band of the antenna tuner 14 and by transmitting the RPC information to the antenna tuner control system (step 198).

If RX_RSSI indicates that the current power level of the receive signal 28 is within the power limits that can be provided by the second adjustable gain of the receiver amplification circuit 54, then the receive power control software module 118 determines a value of the first desired receive power level for the receive signal 28 based on the RPC information (step 200). For example, if the receive power adjustment time period is synchronized with each of the slots 128, (shown in FIG. 5) then the first desired receive power level may be expressed as:

$$P_{DesiredR}(k) = PRX\_RSSI(k) + \Delta step(k) * Dir(k)$$

Where $P_{DesiredR}(k)$ is the first desired receive power level, PRX_RSSI (k) is the current power level of the receive signal 28 as indicated by RX_RSSI, $\Delta step(k)$ is the magnitude of power change indicated by the power step information, Dir(k) is the direction of the power change indicated by the direction information, and k is an integer indicating a particular slot 128. If the mobile user device is not in the normal mode, other algorithms may be synchronized with sub-frames 132 or even data frames 130. In this case, the transmit power control system module may select the power step information for one of the slots 128 in the sub-frame 132 or data frame 130 or combine the power step information by averaging and the like and perform a hard decision based on the direction information of each or some of the slots 128 in the sub-frame 132 or data frame 130 to determine a combined direction of change. Finally to calculate $P_{DesiredR}$ (k) other parameters may be added or subtracted. For example, if the mobile user device is operating in a compressed mode then an additional parameter may be added to the equation such as PSIR(k) which may be a power adjustment based on variations in RX_SNIR_TARGET. Another parameter than may be calculated and added to the above mentioned equation is $P_{bal}(k)$ the powers of all channels to a common reference power, as provided by, for example, a common pilot channel (CPICH). These and other calculations of the first desired receive power level and parameters for calculating the first desired receive power level would be apparent to one of ordinary skill in the art in light of this disclosure and are considered within the scope of the disclosure.

Upon calculating the first desired receive power level of the receive signal 28, the receive power control software module 118 determines a parameter RX_Control which indicates a signal level of the receive power control signal 62 for the receive power control device 56 and generate this receive power control signal 62 accordingly (step 202). The receive power control signal 62 may be transmitted to the receive power control device 56 which adjusts the second adjustable gain of the receiver amplification circuit 54 to reduce a difference between the current power level of the receive signal 28 and the first desired receive power level of the receive signal 28.

Ideally, this adjustment of the second adjustable gain eliminates the difference between the current power level of the receive signal 28 and the first desired receive power level but this may not be the case. Accordingly, the receive power control software module 118 again receives the parameter RX_RSSI which now indicates the new current power level of the receive signal 28 based on the signal level of the either the receive signal 28 or the receive feedback signal 66 (step 204). The new RX_RSSI is compared to the first desired receive power level of the receive signal 28 (step 206). If the comparison indicates that the current power level is not equal to the first desired receive power level, then the difference between the first desired receive power level and the current power level, while reduced has not been eliminated. Accordingly, steps 202-206 are repeated continuously so long as the difference between the first desired receive power level and the current power level has not been eliminated or until the time that the current receive power adjustment time period ends.

Figure 9:
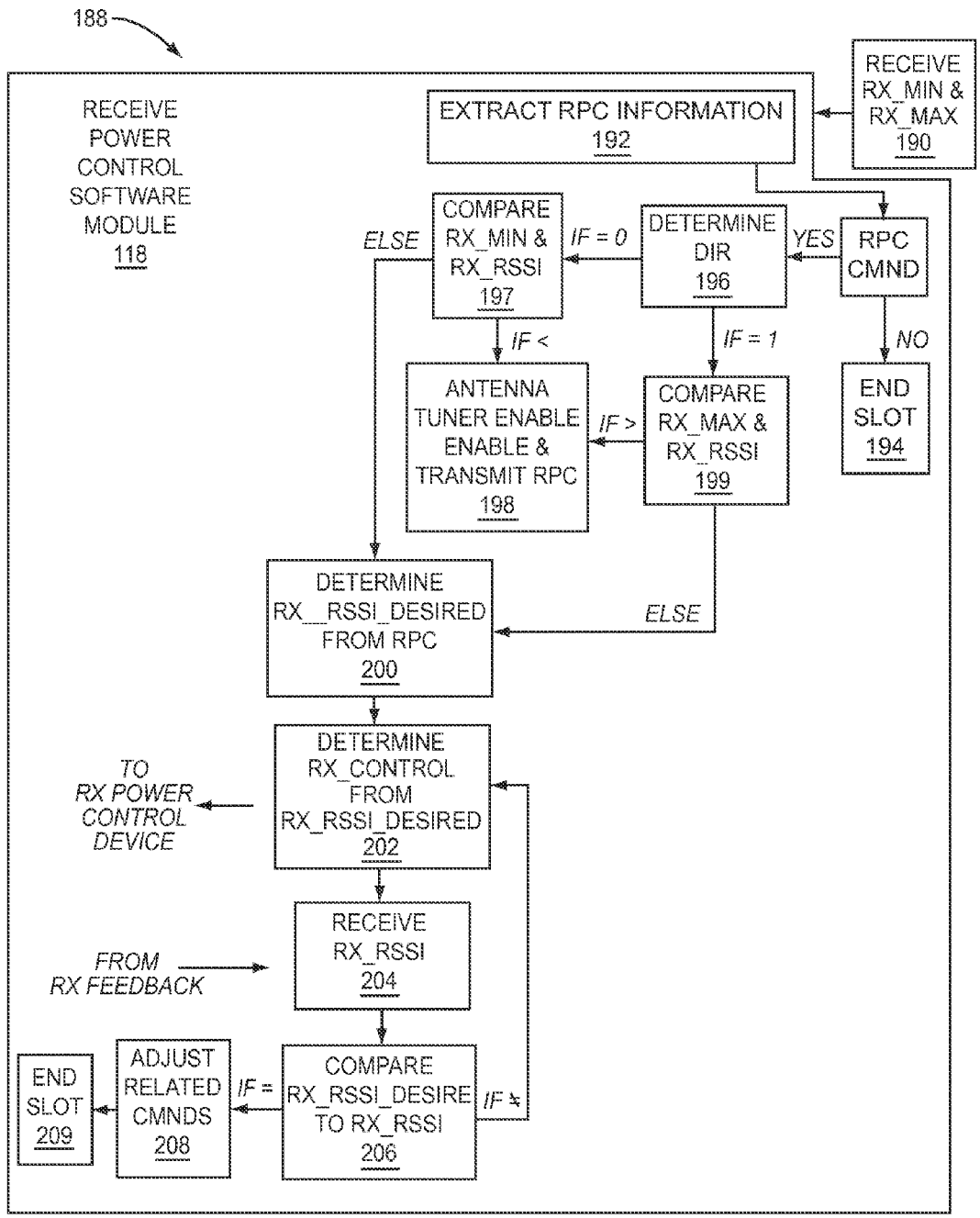
FIG. 9 illustrates one embodiment of a power control process implemented by the receive power control software module.

For the steps 190-206 described in FIG. 9, the receive signal 28 has been received by the antenna 12 within the DDPCH and thus formatted in accordance with the specifications of the DDPCH. However, as discussed above, the transceiver 10 may receive a plurality of receive signals within different physical downlink channels on the antenna 12. For example, receive signals may be received within physical downlink channels including, but not limited to, a DE-DPCH, a DF-DPCH, a DE-RGCH, a DE-HICH, a DDPRACH, a DP-CCPCH, a DS-CCPCH, a DHS-DSCH, or the like.

The receiver circuit 20 may include a plurality of parallel or partially parallel receiver chains similar to the receiver chain of the receiver circuit 20 described in FIG. 1 to down convert each of the receive signals out of their respective physical downlink channels. The multiplexer 16, the first multiplexer port 30, and the third multiplexer port 34 may include a switch or switches that coordinate the traffic among all of these receive signals. The receiver circuit may have a receiver amplification circuit with an adjustable gain for each of these receiver chains and each of these may be controlled by the receiver power control signal associated with the receiver chain of a respective physical downlink channel. Thus, the receive power control software module 118 may have parallel processes similar to those described in and steps 174-186 and steps 190-206 of FIG. 9 for each or some of the receive signals. However, each parallel process takes up processing resources and presents inefficiencies. Instead, the factor $P_{bal}(k)$ may be provided which balances the various physical downlink channels to a common reference power. The receive power control software module 118 may provide $P_{bal}(k)$ for the other physical downlink channels (step 208). The adjustable gains of the amplification circuits may be adjusted accordingly. One of ordinary skill in the art would know how to determine these $P_{bal}(k)$ in light of this disclosure.

After the physical uplink channels have been adjusted as discussed above for step 208, the receive power control software module 118 ends the process for the particular slot 128 (step 209). The transceiver 10 may then begin processing the next slot 128. In this case, the receive power control process 188 may be repeated to determine if the signal to noise ratio of the receive signal 28 is at the desired RX_SNIR_Desired. If not or if the RX_SNIR_Desired has changed, RPC information may be generated having RPC information for adjusting the current power level to a second desired receive power level. Then the receive power control process 188 may be repeated during the receive power adjustment time period of the next slot 128. Thus, the subsequent slots 128 may each be associated with the RPC information. The RCP information generation process 173 and receive power control process 188 of FIGS. 8 and 9 may be repeated continuously so long as the information stream of the transmission signal 26 and the receive signal 28 is maintained between the mobile user device 8 and the base station.

Figure 10:
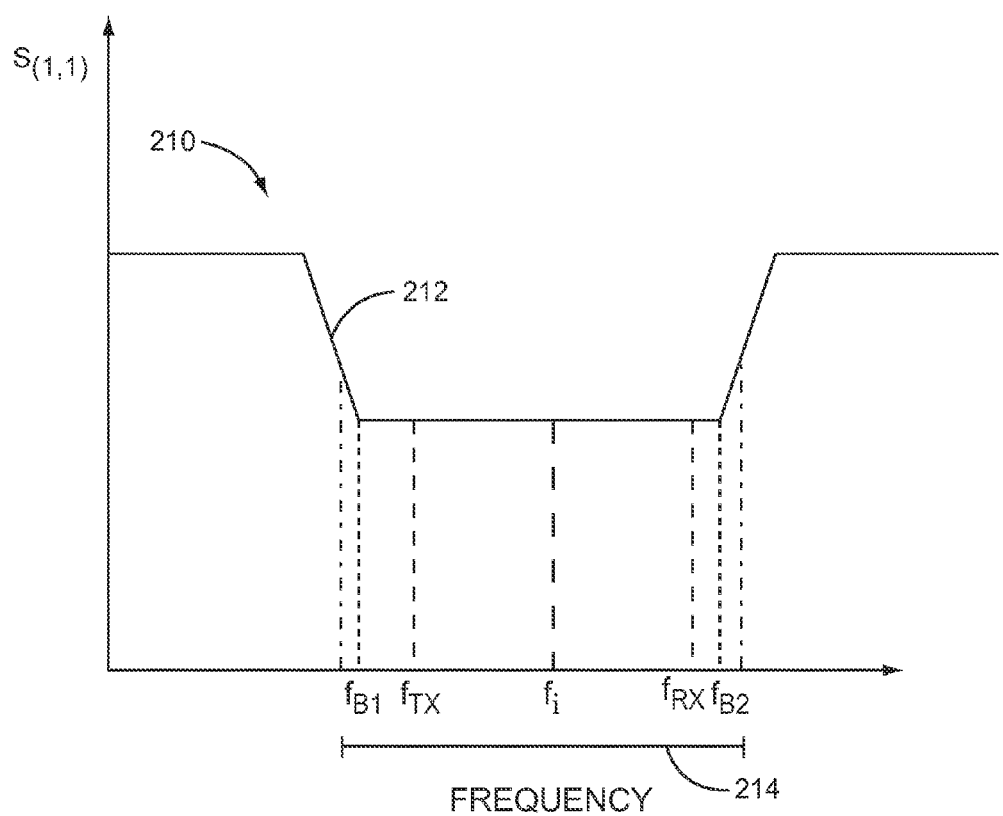
FIG. 10 illustrates one embodiment of an S11 response for one configuration of the antenna tuner shown in FIG. 1 having one type of pass band.

Referring now to FIGS. 1, 10, FIG. 10 illustrates the $S_{11}$ response 210 for one embodiment of the antenna tuner 14. The $S_{11}$ response 210 is determined by an impedance response of the antenna tuner 14. In this case, the $S_{11}$ response 210 indicates that the antenna tuner 14 provides a pass band 212. The pass band 212 has an intermediate frequency, $f_i$, a first break frequency $f_{B1}$ associated with a transmission frequency, $f_{TX}$, and a second break frequency $f_{B2}$ associated with a receive frequency, $f_{RX}$. Accordingly the pass band 212 of the antenna tuner 14 has a bandwidth 214 having a value of approximately $f_{B2}-f_{B1}$. This bandwidth 214 may be defined as the 3 dB bandwidth of the pass band 212, which may actually be slightly larger than $f_{B2}-f_{B1}$. The intermediate frequency, of the antenna tuner 14 may be any frequency between the first break frequency $f_{B1}$ and the second break frequency $f_{B2}$, such as the center frequency of the pass band 212. The intermediate frequency, $f_i$, may also be associated with a resonant frequency of the current impedance response of the antenna tuner 14.

A transmission frequency $f_{TX}$, is the transmission frequency of the transmission signal 26 and thus also the physical uplink channel. The receive frequency $f_{RX}$, is the receive frequency of the receive signal 28 and thus the physical downlink channel. Consequently, the pass band 212 of the antenna tuner 14 may be utilized to allow communication of a physical uplink channel and a physical downlink channel in a transport channel. In this embodiment, the physical uplink channel is the UDPCCH and the physical downlink channel is the DDPDCH and thus the transport channel may be a dedicated transport channel (DCH). As mentioned above, the transceiver 10 may transmit a plurality of transmission signals and receive signals and the impedance response of the antenna tuner 14 may be variable to adjust the pass band 212.

For example, the antenna tuner 14 may include various reactive elements, such as inductive elements and/or capacitive elements having variable reactive impedance values. The antenna tuner control system may transpose the pass band 212 by controlling the variable reactive impedance values to place the intermediate frequency, $f_i$, between a desired transmission frequency, such as the transmission frequency $f_{TX}$, and a desired receive frequency, such as the receive frequency $f_{RX}$, thus shifting the pass band 212 along the frequency spectrum. Furthermore, different transport channels may have different offsets between the transmission frequency and the receive frequency. Accordingly, the antenna tuner control system can also adjust the bandwidth 214.

Figure 11:
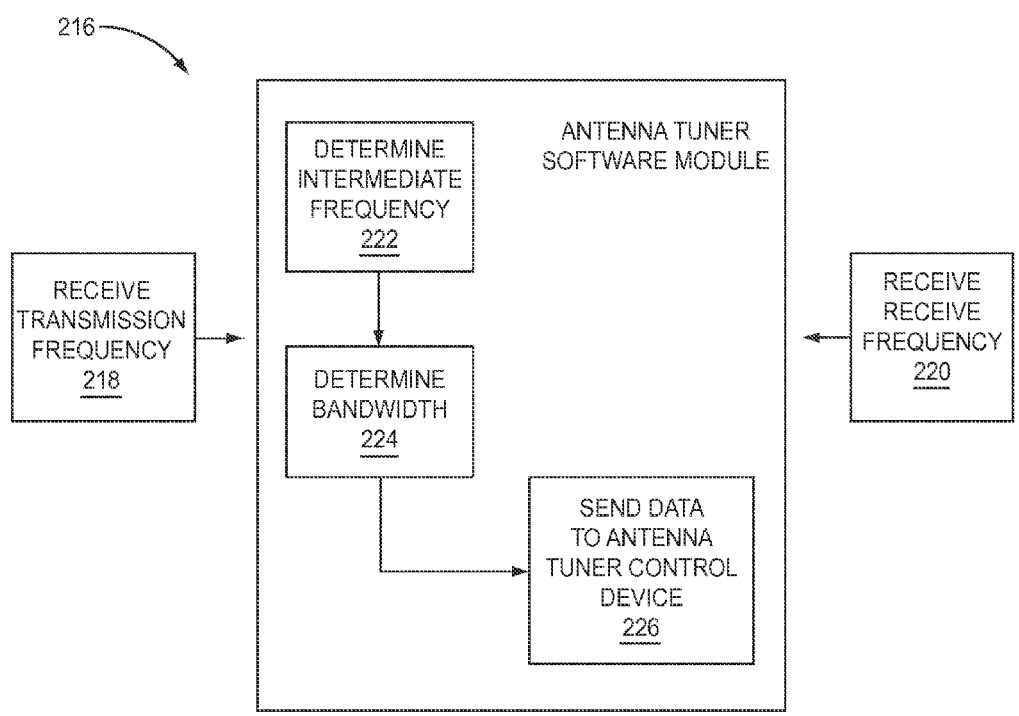
FIG. 11 illustrates one embodiment of a pass band adjustment process implemented by an antenna tuner software module.

Referring now to FIGS. 1, 10, and 11, FIG. 11 illustrates a pass band adjustment process 216 executed by the antenna tuner software module 120 of the antenna tuner control system. The antenna tuner software module 120 may receive the transmission frequency of the physical uplink channel (step 218) and the receive frequency of the physical downlink channel (step 220). In the alternative, the antenna tuner software module 120 may simply receive the intermediate frequency and offsets to the transmission frequency $f_{TX}$ and receive frequency $f_{RX}$. Additionally, information identifying or relating to the physical uplink channel and the physical downlink channel may be also be provided to determine the transmission frequency $f_{TX}$, receive frequency $f_{RX}$, intermediate frequency $f_i$ and/or offsets based on this information.

Next, the antenna tuner software module 120 may then determine the intermediate frequency, $f_i$ of the pass band 212 (step 222) and also the required bandwidth 214 of the pass band 212 (step 224). The required bandwidth 214 may also be determined by calculating or receiving an offset of the transmission frequency and receive frequency from the intermediate frequency $f_i$. In the alternative, stored values for the intermediate frequency, $f_i$ and the bandwidth 214 may be received by the antenna tuner software module 120 and the antenna tuner software module 120 may access these stored values based on the identified physical uplink channel and physical downlink channel.

The value of the intermediate frequency $f_i$, bandwidth 214, and/or offsets may be transmitted as data by the antenna tuner software module 120 through the antenna tuner control signal 80 to the antenna tuner control device 68 (step 226). The antenna tuner control device 68 may then control the variable impedance values of the inductive elements and/or capacitive elements of the antenna tuner 14 to adjust the impedance response accordingly. The first break frequency $f_{B1}$ and second break frequency $f_{B2}$ may be set as close as possible to the transmission frequency $f_{TX}$, and receive frequency $f_{RX}$, respectively. This may be done to minimize the bandwidth 214 so as to maintain the highest quality factor (Q-factor) possible. However, non-ideal circuit behavior in addition to practical accuracy considerations may require for there to be some buffer between the first break frequency $f_{B1}$ and the transmission frequency $f_{TX}$ and second break frequency $f_{B2}$ and the receive frequency $f_{RX}$.

Figure 12:
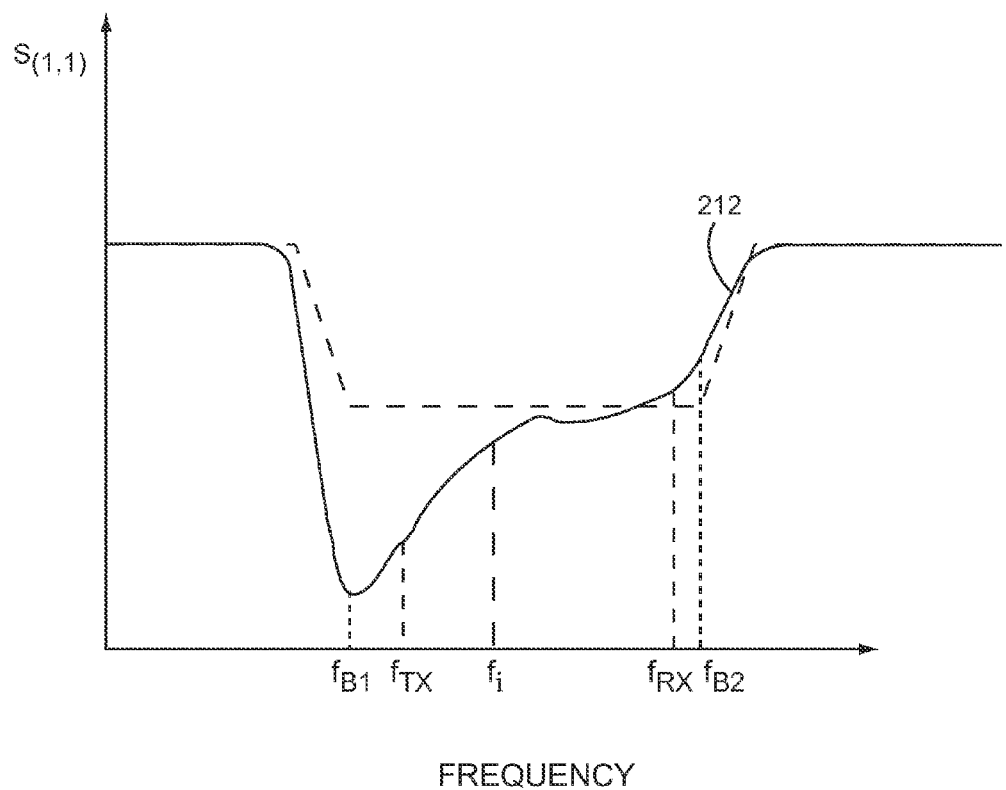
FIG. 12 illustrates the pass band shown in FIG. 10 degraded towards a receive frequency to increase the Q-factor at a transmission frequency.

Referring now to FIGS. 1 and 12, FIG. 12 illustrates the pass band 212 degraded by the antenna tuner control system towards the physical downlink channel and thus towards the receive frequency $f_{RX}$. Since the Q-factor for the pass band 212 and the bandwidth 214 are inversely proportional, the Q-factor may not be increased without potentially blocking the transmission frequency $f_{TX}$ and second break frequency $f_{B2}$ and the receive frequency $f_{RX}$. Thus, the antenna tuner control system adjusts the impedance response so that the Q-factor towards the physical downlink channel is sacrificed to increase the Q-factor towards the physical uplink channel, and accordingly towards the transmission frequency, $f_{TX}$. In this case, the intermediate frequency, $f_i$, shifts towards the transmission frequency, $f_{TX}$. The antenna tuner control system may degrade the pass band towards the physical downlink channel to increase the current power level of the transmission signal 26.

Figure 13:
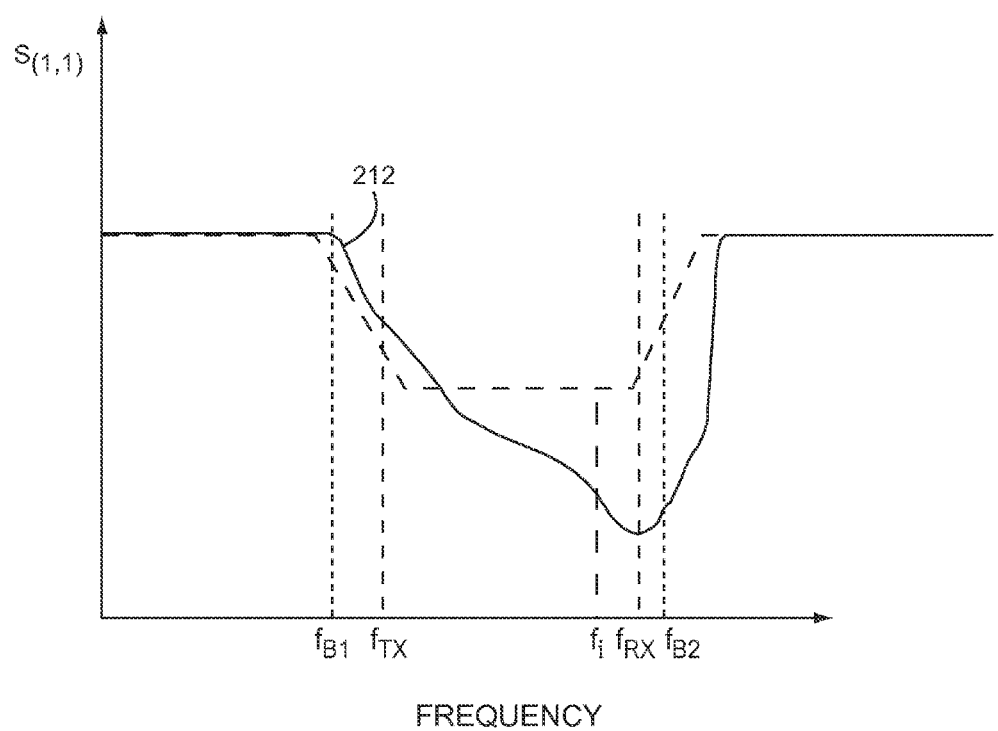
FIG. 13 illustrates the pass band shown in FIG. 10 degraded towards the transmission frequency to increase the Q-factor at the receive frequency.

Referring now to FIGS. 1 and 13, FIG. 13 illustrates the pass band 212 degraded by the antenna tuner control system towards the physical uplink channel and thus towards the transmission frequency $f_{TX}$. In this case, the antenna tuner control system adjusts the impedance response so that the Q-factor towards the physical uplink channel is sacrificed to increase the Q-factor towards the physical downlink channel, and accordingly towards the receive frequency, $f_{RX}$. Thus, the intermediate frequency, $f_i$, shifts towards the receive frequency, $f_{RX}$. The antenna tuner control system may degrade the pass band towards the physical uplink channel to increase the current power level of the receive signal 28.

Figure 14:
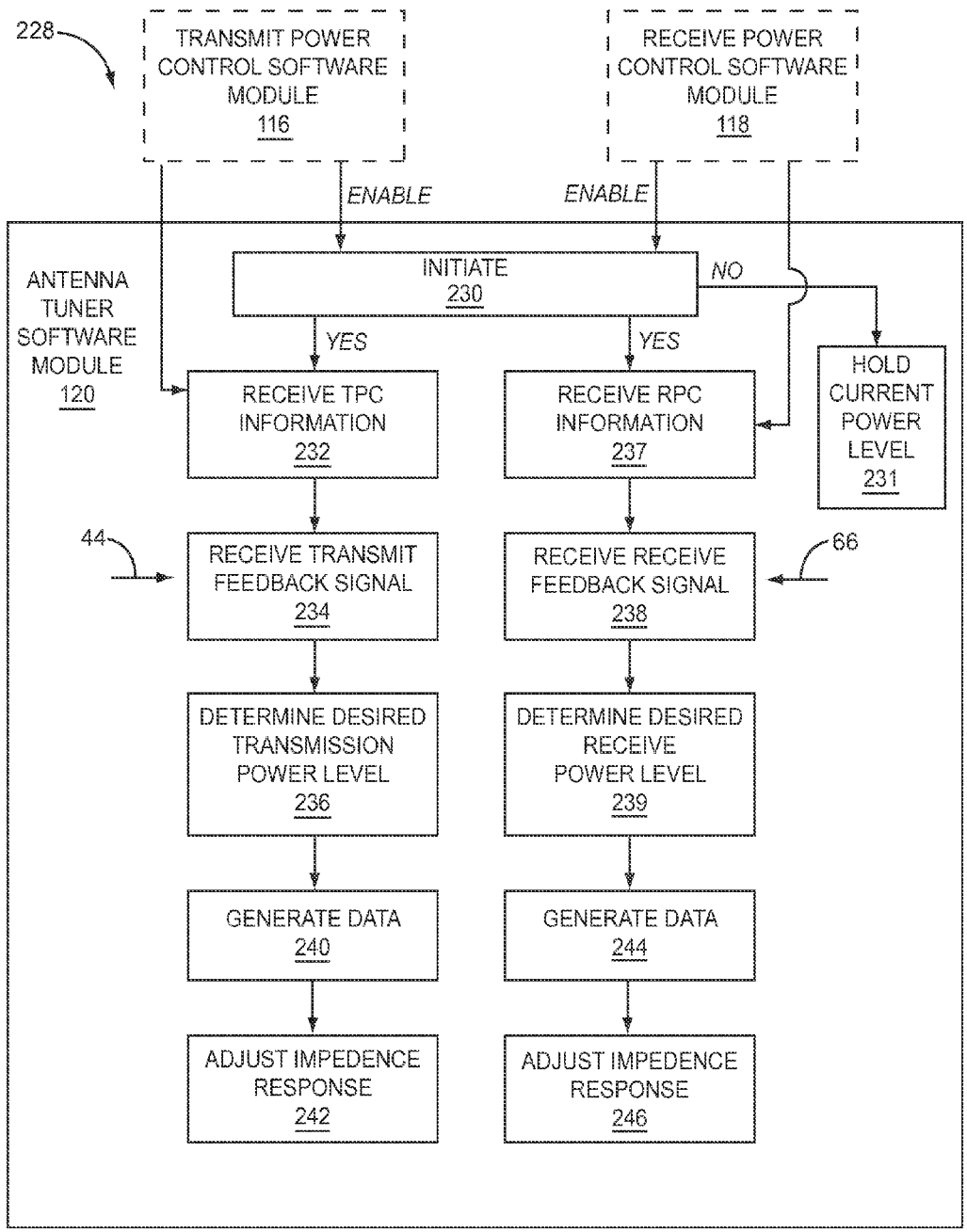
FIG. 14 illustrates one embodiment of a power control process implemented by an antenna tuner software module.

Referring now to FIGS. 1 and 14, FIG. 14 illustrates a power control process 228 of the antenna tuner software module 120. In this embodiment, the power control process is initiated (step 230) if either the transmit power control software module 116 or the receive power control software module 118 have enabled the antenna tuner software module 120. As discussed above for FIG. 7, the transmit power control software module 116 may enable the antenna tuner software module 120 if TX_POW is either above or below TX_MAX or TX_MIN. Similarly, in FIG. 9, the receive power control software module 118 may enable the antenna tuner software module RX_RSSI is above or below RX_MAX and RX_MIN. In this case, the transmission amplification circuit 40 or the receiver amplification circuit 54 have reached their respective minimum or maximum power limits and are unable to adjust the current power level of the transmission signal 26 or the current power level of the receive signal 28 in accordance with the TPC command and/or the RPC command. Also, if only one of either the transmit power control software module 116 and the receive power control software module 118 or neither the transmit power control software module 116 or the receive power control software module 118 have enabled, then the current power levels of the for the non-enabling software module(s) 116, 118 are held (step 231).

If the transmit power control software module 116 has enabled the antenna tuner software module 120, the antenna tuner software module 120 receives the TPC information (step 232) and also the transmit feedback signal 44 (step 234). Based on the TPC information and the signal level of the transmit feedback signal, the antenna tuner software module 120 determines the first desired transmission power level (step 236). Similarly, if the receive power control software module 118 has enabled the antenna tuner software module 120, the antenna tuner software module 120 receives the RPC information (step 237) and also the receive feedback signal 66 (step 238). Based on the RPC information and the signal level of the receive feedback signal 66, the antenna tuner software module 120 determines the first desired receive power level (step 239). In the alternative, the antenna tuner software module 120 may receive the receive signal 28 or utilize the RX_RSSI value, which may be within the RPC information to determine the first desired receive power level.

If the transmit power control software module 116 has enabled the antenna tuner software module 120, then the antenna tuner software module 120 generates data indicating the required impedance response to reduce and ideally eliminate the difference between the current power level of the transmission signal 26 and the first desired transmission power level (step 240). This data is sent through the antenna tuner control signal 80 (step 242) and the antenna tuner control device 68 may then adjust the impedance response to degrade the pass band 212, as explained above in FIGS. 12 and 13, based on antenna tuner control signal 80. For example, if the TPC information is a TPC command requiring an increase in the current power level of the transmission signal 26, then the transmission amplification circuit 40 has reached the maximum power level that may be provided by the first adjustable gain. Accordingly, the pass band 212 is adjusted as shown in FIG. 12, which increases the Q-factor at the physical uplink channel and thus the current power level of the transmission signal 26.

If the receive power control software module 118 has enabled the antenna tuner software module 120, then the antenna tuner software module 120 generates data indicating the required impedance response to reduce and ideally eliminate the difference between the current power level of the receive signal 28 and the first desired receive power level (step 244). This data is sent through the antenna tuner control signal 80 (step 246) and the antenna tuner control device 68 may then adjust the impedance response to degrade the pass band 212, as explained above in FIGS. 12 and 13, based on antenna tuner control signal 80. For example, if the RPC information is a RPC command requiring an increase in the current power level of the receive signal 28, then the receiver amplification circuit 54 has reached the maximum power level that may be provided by the second adjustable gain. Accordingly, the pass band 212 is adjusted as shown in FIG. 13, which increases the Q-factor at the physical downlink channel and thus the current power level of the receive signal 28.

When both the transmit power control software module 116 and the receive power control software module 118 have enabled the antenna tuner software module 120 (step 230), and both the TPC information and the RPC information are requesting changes in the power level in the same direction, then determining the required impedance response (step 236 and step 239) may require use of a metric to reduce the difference of both the current power level of the transmission signal 26 with the first desired transmission power level and the current power level of the receive signal 28 with the first desired receive power level. For example, if the TPC information and the RPC information both are requesting increases in the current power levels of the transmission signal 26 and the receive signal 28, a metric may be utilized to determine the manner in which to sacrifice the Q-factor, which complies with the TPC commands and the RPC commands. Preferably, this metric should be minimized if possible.

This metric may be conceptually expressed as:

$$f_T(\text{TPC information}, TX\_MAX) * W_T(TX\_POW) + f_R(RPC \text{ information}, RX\_MAX) * W_R(RX\_RSSI)$$

The function $f_T$(TPC information, TX_MAX) is a function that varies based on TPC information and TX_MAX and $W_T$(TX_POW) is a weight that varies based on the TX_POW and thus the current power level of the transmission signal 26. Similarly, the function $f_R$(RPC information, R_MAX) is a function that varies based on RPC information and RX_MAX and $W_R$(RX_RSSI) is a weight that varies based on the RX_RSSI and thus the current power level of receive signal 28. It would be apparent to one of ordinary skill in the art how to determine the function $f_T$(TPC information, TX_MAX), weight $W_T$(TX_POW), function $f_R$(RPC information, RX_MAX), and weight $W_R$(RX_RSSI) in light of this disclosure. The power control process 228 described in FIG. 14 may be continuously repeated to adjust the current power levels of the transmission signal 26 and receive signal 28 to different desired power levels so long as the transmission signal 26 and the receive signal 28 information stream are maintained and the transmit power control software module 116 and the receive power control software module 118 have enabled changes to the pass band.

Figure 15:
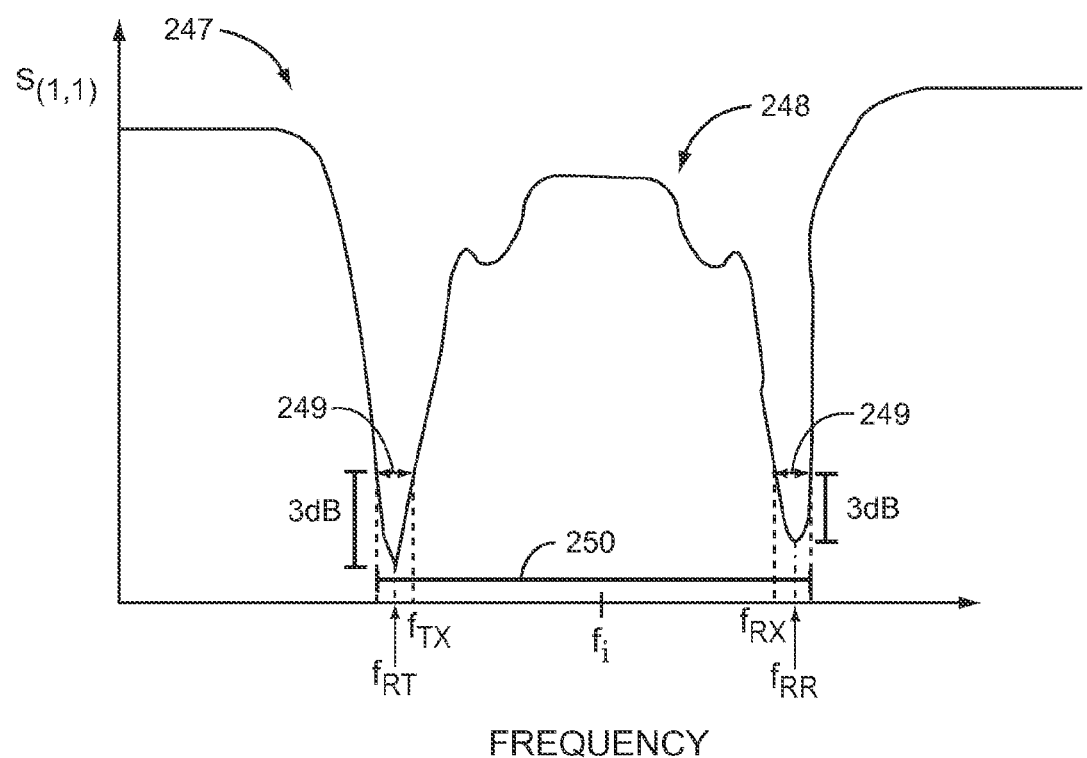
FIG. 15 illustrates another embodiment of an S11 response for another configuration of the antenna tuner shown in FIG. 1 having another type of pass band.

Referring now to FIGS. 1 and 15, FIG. 15 illustrates another type of $S_{11}$ response 247 having a pass band 248 that may be provided by another configuration of the antenna tuner 14. The pass band 248 is determined by the impedance response of the antenna tuner 14 and the antenna 12, and, in this case, is the impedance response as determined from the first multiplexer port 30. The pass band 248 has a transmission resonant frequency $f_{RT}$ associated with the transmission frequency $f_{TX}$ of the physical uplink channel and also a receive resonant frequency $f_{RR}$ associated with the receive frequency $f_{RX}$ of the physical downlink channel. The pass band 248 thus allows for simultaneous matching at the transmission frequency $f_{TX}$ and the receive frequency $f_{RX}$. In this embodiment, transmission resonant frequency $f_{RT}$ and receive resonant frequency $f_{RR}$ are near the edges of a frequency span 250 of the pass band 248. The transmission resonant frequency $f_{RT}$ and receive resonant frequency $f_{RR}$ are associated with two minima of the pass band 248, which are frequencies at which a load impedance (in this case the impedance of the antenna tuner 14 and antenna 12) matches a source impedance (the impedance of the transceiver 10 at the first multiplexer port 30). Note that FIG. 15 shows the two minima of the $S_{11}$ response 247 having around the same $S_{11}$ value. In some embodiments, this may not be the case and the two minima of the transmission resonant frequency $f_{RT}$ and receive resonant frequency $f_{RR}$ may have different $S_{11}$ values.

Ideally, the transmission resonant frequency $f_{RT}$ is precisely at the transmission frequency $f_{TX}$ and the receive resonant frequency $f_{RR}$ is precisely at the receive frequency $f_{RX}$. However, due to practical considerations and non-ideal circuit behavior, this may not be the case. Nevertheless, the transmission frequency $f_{TX}$ and receive frequency $f_{RX}$ should be provided within the 3 dB bandwidth 249 of the transmission resonant frequency $f_{RT}$ and the receive resonant frequency $f_{RR}$, respectively. Between the transmission resonant frequency $f_{RT}$ and the receive resonant frequency $f_{RR}$ is an intermediate frequency, $f_i$, which may be any frequency between the transmission resonant frequency $f_{RT}$ and the receive resonant frequency $f_{RR}$. In this example, the intermediate frequency, $f_i$, is the center frequency between the transmission resonant frequency $f_{RT}$ and the receive resonant frequency $f_{RR}$ and may have a value of approximately $$\frac{f_{RT} + f_{RR}}{2}.$$

The pass band 248 is degraded between the transmission resonant frequency $f_{RT}$ and the receive resonant frequency $f_{RR}$. In this manner, the pass band 248 sacrifices the Q-factor between the transmission resonant frequency $f_{RT}$ and the receive resonant frequency $f_{RR}$, where it may not be need, to provide a higher Q-factor near the transmission frequency $f_{TX}$ and receive frequency $f_{RX}$.

The antenna tuner software module 120 may utilize a process similar to the pass band adjustment process 216 described for FIG. 11 above, to transpose the intermediate frequency, $f_i$ between the transmission frequency $f_{TX}$ and receive frequency $f_{RX}$ of different transport channels. Similarly, the frequency span 250 may be adjusted so that the transmission frequency $f_{TX}$ and receive frequency $f_{RX}$ of the transport channel are each within 3 dB bandwidth of the transmission resonant frequency $f_{RT}$ and the receive resonant frequency $f_{RR}$.

Figure 16:
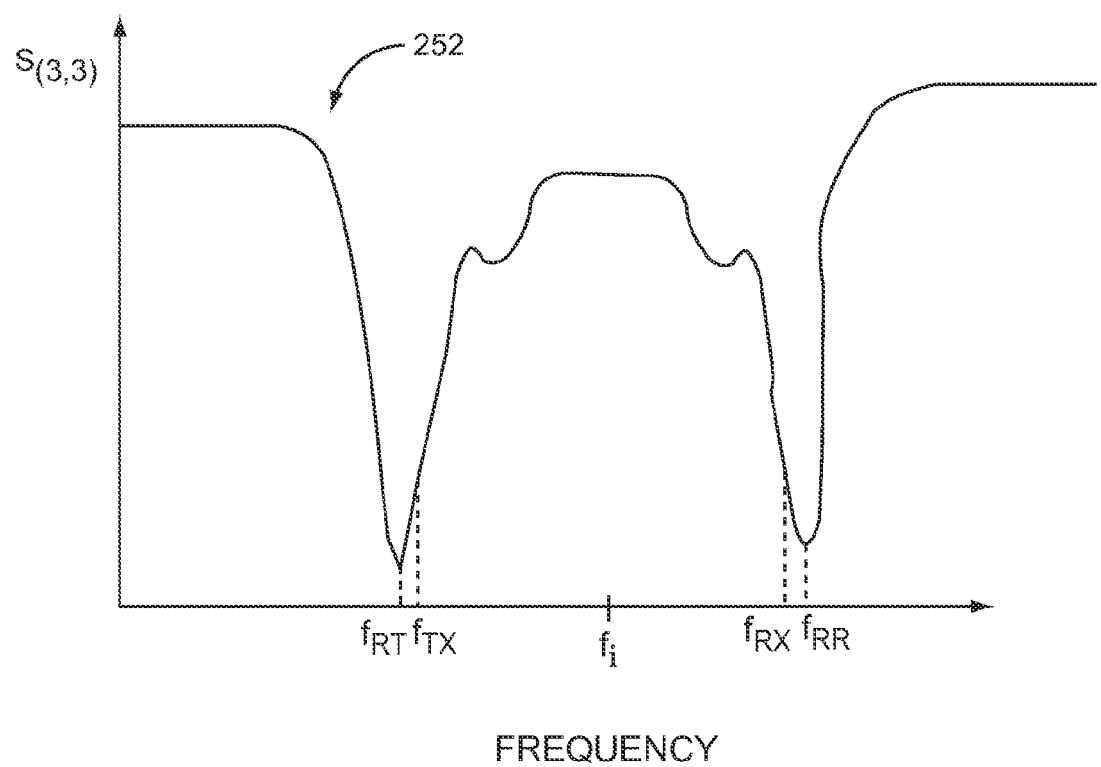
FIG. 16 illustrates one embodiment of an S33 response for the configuration of the antenna tuner having the S11 response shown in FIG. 15.

Referring now to FIG. 1 and FIGS. 14-15, the antenna tuner software module 120 may utilize a process similar to the power control process 228 described above for FIG. 14 except that, in this case, the antenna tuner software module 120 may not generate data (steps 240 and 244) on the antenna tuner control signal 80 that requests for a degradation of the pass band 248 towards either the physical uplink channel or physical downlink channel as shown in FIGS. 12 and 13. Instead, the data generated by the antenna tuner software module 120 (steps 240 and 244) may request further degradations to the pass band 248 between the transmission resonant frequency $f_{RT}$ and the receive resonant frequency $f_{RR}$ to provide even higher Q-factors around the transmission frequency $f_{TX}$ and receive frequency $f_{RX}$. Note that this may shift the intermediate frequency, $f_i$, towards the transmission resonant frequency $f_{RT}$ and the receive resonant frequency $f_{RR}$, particularly if unsymmetrical power level changes are requested for the transmission signal 26 and the receive signal 28. Furthermore, the metric, $f_T(TPC, TX\_MAX)*W_T(TX\_POW)+f_R(RPC$ information, $RX\_MAX)*W_R(RX\_RSSI)$, may not need to be utilized since the pass band 248 may not need to be degraded towards either the physical uplink channel or the physical Referring now to FIGS. 1 and 16, FIG. 16 illustrates the $S_{3,3}$ response 252 for the configuration of the antenna tuner 14 described in FIG. 15. The $S_{3,3}$ response 252 has been calculated based on the free space parameters of the antenna 255. Consequently, the $S_{3,3}$ response 252 is based on the approximated impedance response as seen from the antenna 12 into the transceiver 10. While the magnitudes of the $S_{3,3}$ response 252 may be different than the magnitude of the $S_{11}$ response 247 in FIG. 15, FIG. 16 illustrates that the $S_{3,3}$ response 252 has approximately the same form as the $S_{11}$ response 247, the same intermediate frequency, $f_i$, the same transmission resonant frequency $f_{RT}$, and the same receive resonant frequency $f_{RR}$ to allow for matching at the transmission frequency, $f_{TX}$ and the receive frequency $f_{RX}$.

Figure 17:
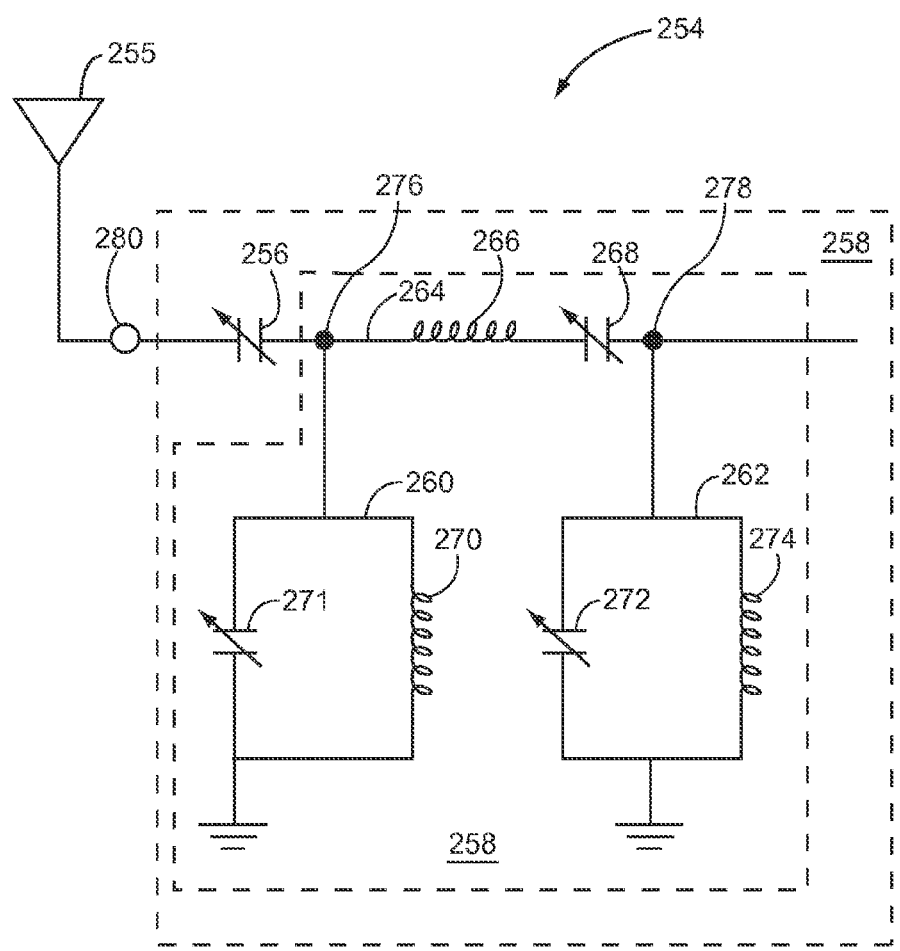
FIG. 17 illustrates one embodiment of an antenna tuner configured to provide the S11 response shown in FIG. 15.

FIG. 17 illustrates one embodiment of an antenna tuner 254 coupled to an antenna 255 and that provides a pass band having the transmission resonant frequency $f_{RT}$, and the receive resonant frequency $f_{RR}$ and allows for matching at both the transmission frequency $f_{TX}$ and the receive frequency $f_{RX}$, as described above in FIGS. 15 and 16. The antenna tuner 254 has a first capacitive element 256, which is configured to provide a variable capacitance. This first capacitive element 256 is coupled to a low-pass pi network 258 having a first shunt connected segment 260, a second shunt connected segment 262, and a first series connected segment 264 that is coupled between the first shunt connected segment 260 and the second shunt connected segment 262.

The illustrated antenna tuner 254 has been designed for and works particularly well if the components of the antenna tuner 254 are substantially lossless components. In this embodiment, the first series connected segment 264 of the low-pass pi network 258 has a first inductive element 266, which in this example is an inductor, and a second capacitive element 268. The first series connected segment 264 forms the series branch of the low-pass pi network 258. In addition, the first inductive element 266 and the second capacitive element 268 are connected in series with each other within the first series connected segment 264.

The first shunt connected segment 260 has a third capacitive element 271 coupled in parallel with a second inductive element 270 and, similarly, the second shunt connected segment 262 has a fourth capacitive element 272 coupled in parallel with a third inductive element 274. In this embodiment, the second capacitive element 268, the third capacitive element 271, and the fourth capacitive element 272 each have a variable capacitance. The first capacitive element 256, the second capacitive element 268, the third capacitive element 271, and the fourth capacitive element 272, may all be PACs that are controllable by the antenna tuner control system. The first shunt connected segment 260 may be coupled in shunt at node 276 while the second shunt connected segment 262 is connected in shunt at node 278 with the first series connected segment 264.

The first shunt connected segment 260 and the second shunt connected segment 262 allow the antenna tuner 254 to have the pass band with both the transmission resonant frequency $f_{RT}$, and the receive resonant frequency $f_{RR}$. The first shunt connected segment 260 resonates with the first series connected segment 264 to provide resonance at the receive resonant frequency $f_{RR}$. The second shunt connected segment 262 resonates with the first series connected segment 264 to provide resonance at the transmission resonant frequency $f_{RT}$. By varying the capacitance of the second capacitive element 268, the third capacitive element 271, and the fourth capacitive element 272 characteristics of the pass band 248, such as the degradation of the pass band 248 between the transmission resonant frequency $f_{RT}$, and the receive resonant frequency $f_{RR}$, and the Q-factor of the transmission resonant frequency $f_{RT}$, and the receive resonant frequency $f_{RR}$ may be adjusted.

To transpose the pass band 248, the first capacitive element 256 is coupled in series with an antenna input terminal 280, which couples the antenna tuner 254 to the antenna 255. The first capacitive element 256 is coupled in series with the antenna 255. The first capacitive element 256 is also coupled in series between the antenna input terminal 280 and the node 276 so as to be coupled in series with the low-pass pi network 258. The variable capacitance of the first capacitive element 256 may be selected to series resonate with the antenna 255, which may have an inductive reactance. In this manner, the intermediate frequency, $f_i$, is set and varying the variable capacitance of the first capacitive element 256 transposes the pass band 248 along the frequency spectrum to place the pass band 248 between the desired transmission resonant frequency $f_{RT}$, and the receive resonant frequency $f_{RR}$. Thus, the antenna tuner control system can control the variable capacitances of the first capacitive element 256, the second capacitive element 268, the third capacitive element 271, and the fourth capacitive element 272 to adjust the characteristics of the pass band 248 in accordance with TPC information and RPC information.

The topology illustrated in FIG. 17 works particularly well when the first capacitive element 256 and the low-pass pi network 258 are lossless components. In one configuration, the antenna tuner 254 was configured to provide a pass band 248 for a transport channel having a transmission frequency of 825 MHz, a receive frequency of 870 MHz, which are offset from an intermediate frequency of 847 MHz. The antenna 255 has an inductive value of approximately 14 nH. The pass band 248 provided a return loss of over –20 dB at both the transmit frequency 825 MHz and the receive frequency 870 MHz. The transmit resonant frequency and the receive resonant frequency of the pass band 248 were almost precisely at 825 MHz and the 870 MHz respectively.

Figure 18:
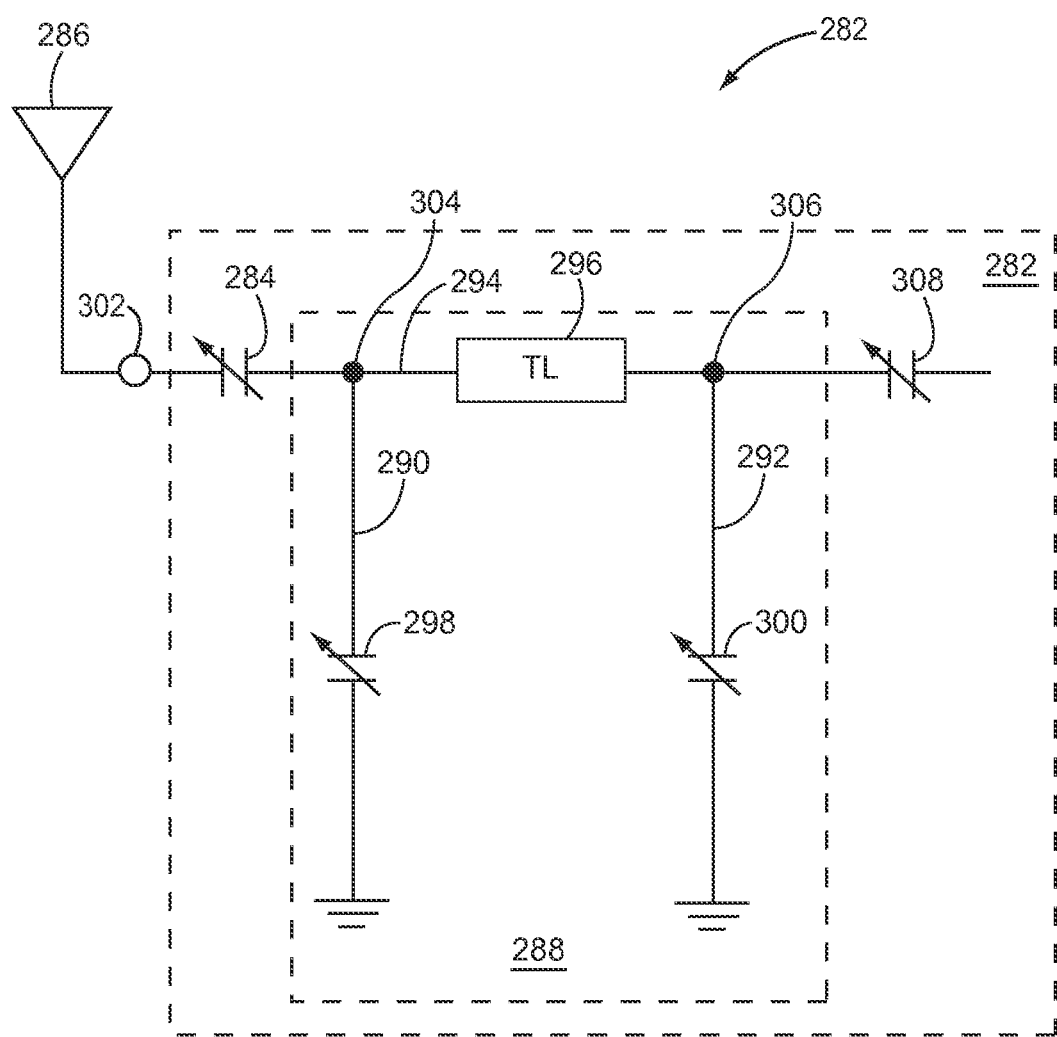
FIG. 18 illustrates another embodiment of an antenna tuner configured to provide a S11 response similar to the one shown in FIG. 15.

FIG. 18 illustrates another embodiment of an antenna tuner 282 that provides a pass band similar to the pass band 248 in FIG. 15. The antenna tuner 282 also has a first capacitive element 284 to series resonate with a low-band antenna 286, and a low-pass pi network 288 to provide a transmission resonant frequency and a receive resonant frequency. In this case, the first capacitive element 284 and the low-pass pi network 288 introduce loss and thus may have a substantial resistance. The low-pass pi network 288 also has a first shunt connected segment 290, a second shunt connected segment 292, and a first series connected segment 294 that is coupled between the first shunt connected segment 290 and the second shunt connected segment 292. In this case, the first series connected segment 294 has a first inductive element 296 while the first shunt connected segment 290 and the second shunt connected segment 292 each have a second capacitive element 298 and a third capacitive element 300, respectively. The first inductive element 296 may be a 50 Ohm transmission line that has an inductance at 18 degrees around 800 MHz.

The first capacitive element 256 is coupled in series between the antenna input terminal 302 and the node 304 so as to be coupled in series with the low-pass pi network 288. At node 306 of the first series connected segment 294, a fourth capacitive element 308 is coupled in series with the low-pass pi network 288. The first capacitive element 284, the second capacitive element 298, third capacitive element 300, and fourth capacitive element 308 each have variable capacitances and may be PACs. In this case, the low-band antenna 286 also has an inductive value of 14 nH. The transmission frequency is provided around 880 MHz and the receive frequency is around 925 MHz. The pass band may have a receive resonant frequency of around 890 MHz and a transmission resonant frequency of around 915 MHz with an intermediate frequency of the pass band around 910 MHz. and thus has been shifted towards the physical downlink channel. At the transmission frequency of 880 MHz the return loss is around –16.1 dB and the receive frequency of 925 MHz the return loss is around –14.9 dB.

Figure 19:
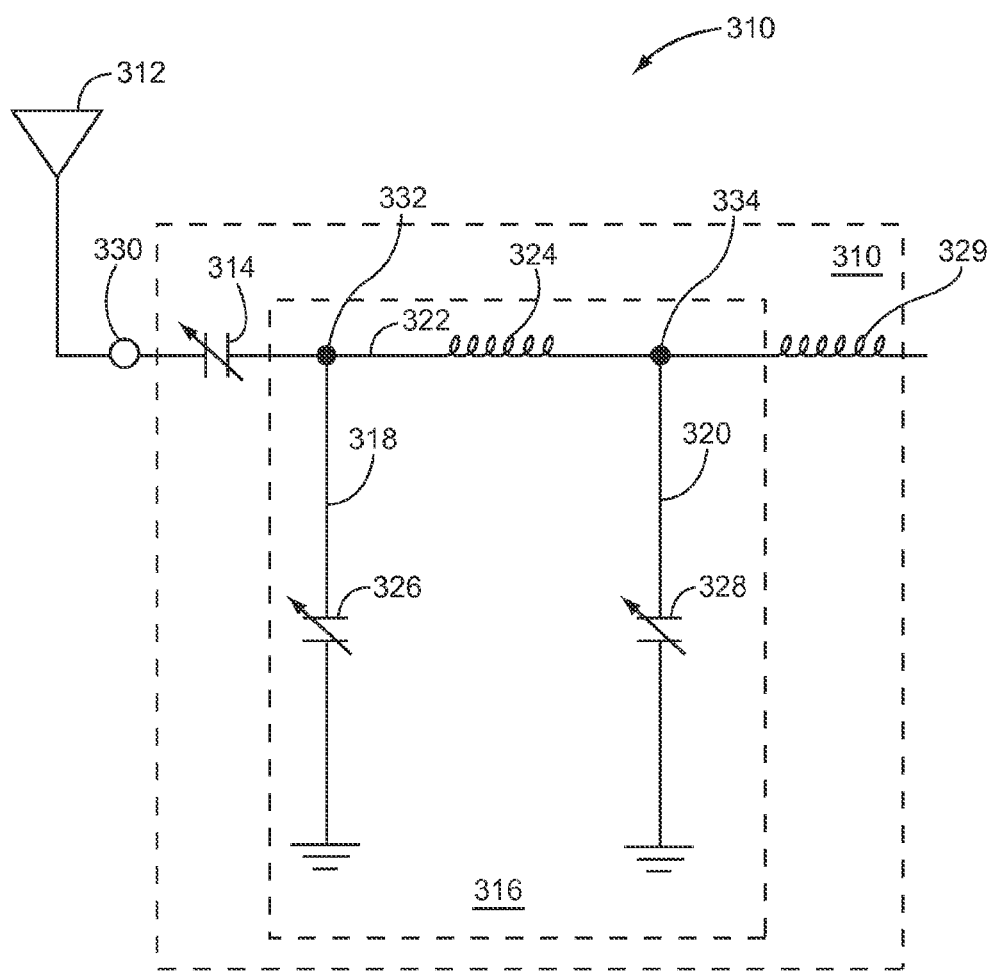
FIG. 19 illustrates yet another embodiment of an antenna tuner configured to provide a S11 response similar to the one shown in FIG. 15.

FIG. 19 illustrates yet another embodiment of an antenna tuner 310, in this case coupled to a high-band antenna 312. The antenna tuner 310 provides a pass band similar to the pass band 248 in FIG. 15, except at high band frequencies. The antenna tuner 310 also has a first capacitive element 314 to series resonate with the high-band antenna 312, and a low-pass pi network 316 that provides a transmission resonant frequency and a receive resonant frequency. In this case, the first capacitive element 314 and the low-pass pi network 316 are assumed to be lossless and do not have a substantial resistance. The low-pass pi network 316 also has a first shunt connected segment 318, a second shunt connected segment 320, and a first series connected segment 322 that is coupled between the first shunt connected segment 318 and the second shunt connected segment 320. In this case, the first series connected segment 322 has a first inductive element 324 while the first shunt connected segment 318 and the second shunt connected segment 320 each have a second capacitive element 326 and a third capacitive element 328, respectively. The first inductive element 324 may be an inductor having an inductance of 1.5 nH.

The first capacitive element 314 is coupled in series between the antenna input terminal 330 and the node 332 so as to be coupled in series with the low-pass pi network 316. At node 334 of the first series connected segment 322, a second inductive element 329 is coupled in series with the low-pass pi network 316. The first capacitive element 314, the second capacitive element 326, third capacitive element 328, each have variable capacitances and may be PACs. In this case, the high-band antenna 312 is modeled with free space parameters. The transmission frequency is provided around 1920 MHz and the receive frequency is around 2110 MHz for the transport channel. The pass band may have a receive resonant frequency of around 1.9 GHz and a transmission resonant frequency of around 2.15 GHz with an intermediate frequency of the pass band around 2 GHz. and thus the intermediate frequency has been shifted towards the physical downlink channel. At the transmission frequency of 1920 MHz, the return loss is around −7.30 dB and, at the receive frequency of 2110 MHz, the return loss is around −7.33 dB.

Figure 20:
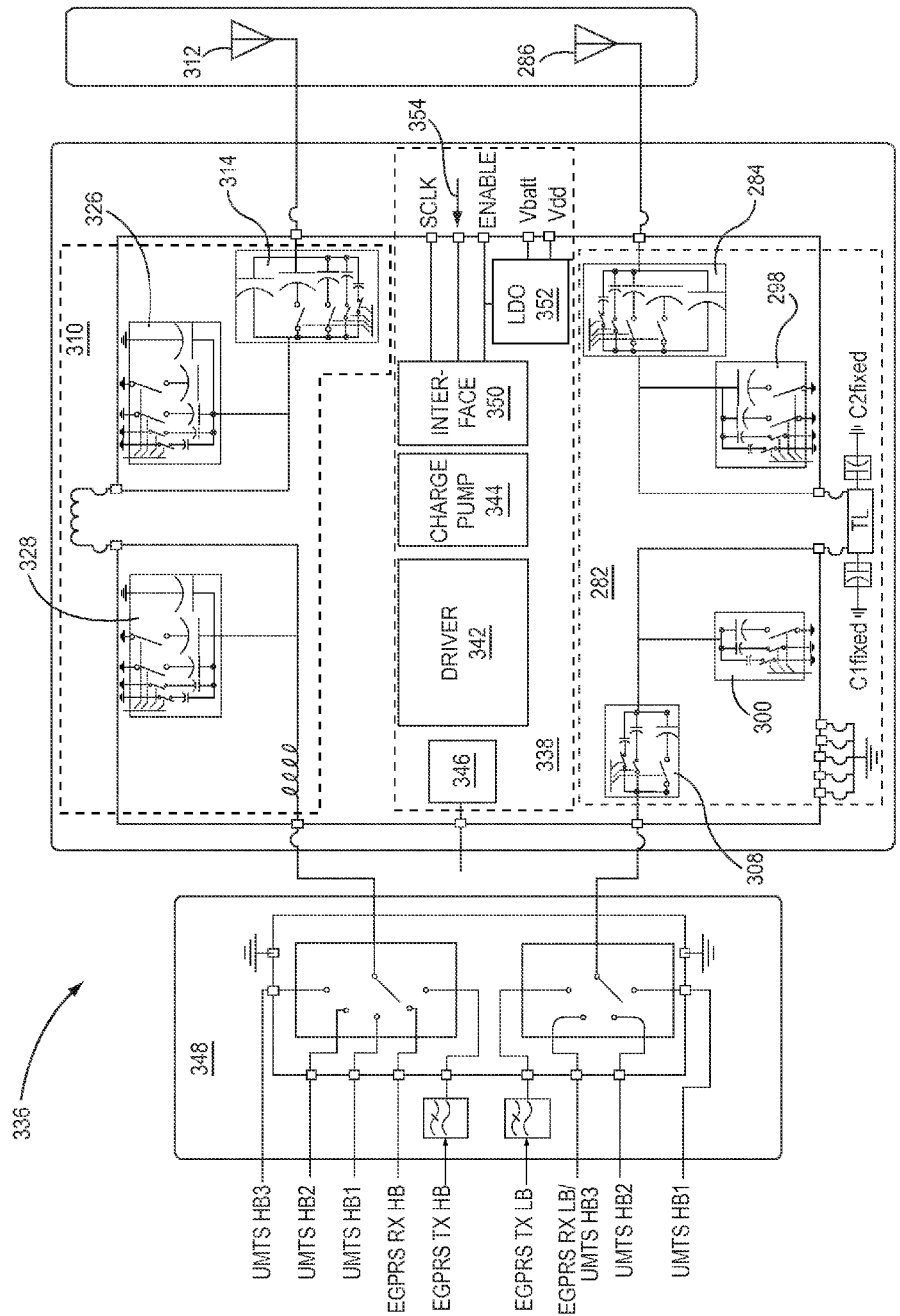
FIG. 20 illustrates one embodiment of a dual band antenna tuner.

Referring now to FIG. 20, FIG. 20 illustrates one embodiment of a dual band antenna tuner 336. The dual band antenna tuner 336 includes the antenna tuner 282, as described above in FIG. 18, tunes the low-band antenna 286. The dual band antenna tuner 336, as described above in FIG. 19, tunes the high-band antenna 312. Also shown is an antenna tuner control device 338 that controls the dual band antenna tuner 336. The first capacitive element 284, the second capacitive element 298, the third capacitive element 300, and the fourth capacitive element 308 of the antenna tuner 282 are illustrated as PACs having switches that control the connections to the array of capacitors and thus vary the capacitive values of the PACs. Similarly, the first capacitive element 314, the second capacitive element 326, and the third capacitive element 328 of the antenna tuner 310 are illustrated as PACs. The antenna tuner control device 338 receives an antenna tuner control signal 340 and varies these capacitive values accordingly.

The switches in the PACs are actuated by a driver 342 that is operable to provide voltages at +2.5/−2.5 volts. The driver 342 may utilize a charge pump 344 to provide these voltages. A controller 346 of the antenna tuner control device 338 may include a processor and chip memory with computer executable instructions that set the impedance values of the various capacitive elements 284, 298, 300, 308, 314, 326, 328, and 310 utilizing the driver 342. The controller may be communicably associated with an interface 350 such as a two wire mobile industry processor interface (MIPI) or a simple 1 wire control interface. In the alternative, the interface 350 may be a custom RF-Bus, or the like. The interface 350 may receive an antenna tuner control signal 354, as described above, to process and set the impedance response of the antenna tuner 282 and the antenna tuner 310 accordingly.

A low drop out regulator (LDO) 352 may be utilized to provide a direct supply voltage from the battery or to receive a regulated supply from the $V_{dd}$ line for low battery voltage applications. The first capacitive element 284 of the antenna tuner 282 and the first capacitive element 314 of the antenna tuner 310 allows for a counter clock-wise impedance rotation of the antenna impedance to transform low-band and high-band impedances at both the transmit and receive frequencies for Code Division Multiple Access (CDMA), Long Term Evolution (LTE) transport channels.

The dual band antenna tuner 336 is coupled to a multiplexer 348 that allows for the transmission and reception of a plurality of high-band and low-band transport channels on both the high-band antenna 312 and the low-band antenna 286. For each high-band and low-band transport channels the transmit circuit and receiver circuit of a transceiver may include a plurality of transmit and receiver chains. The controller 346 may be utilized to determine the delivered power and to determine adjustments to the capacitive values in the antenna tuner 282 and antenna tuner 310 to maximize the delivered power.

The dual band antenna tuner 336 and the antenna tuner control device 338 may be built on a silicon on insulator (SOI) die with CX50 laminate. A silicon on sapphire (SOS) die may also be utilized or, in the alternative, a micro-electromechanical substrate (MEMS) or a barium strontium titanate substrate (BST). Conformal shielding may also be provided to protect the dual band antenna tuner 336 and antenna tuner control device 338 from external electromagnetic emissions and to prevent internal electromagnetic emissions from effecting external components.

Figure 21:
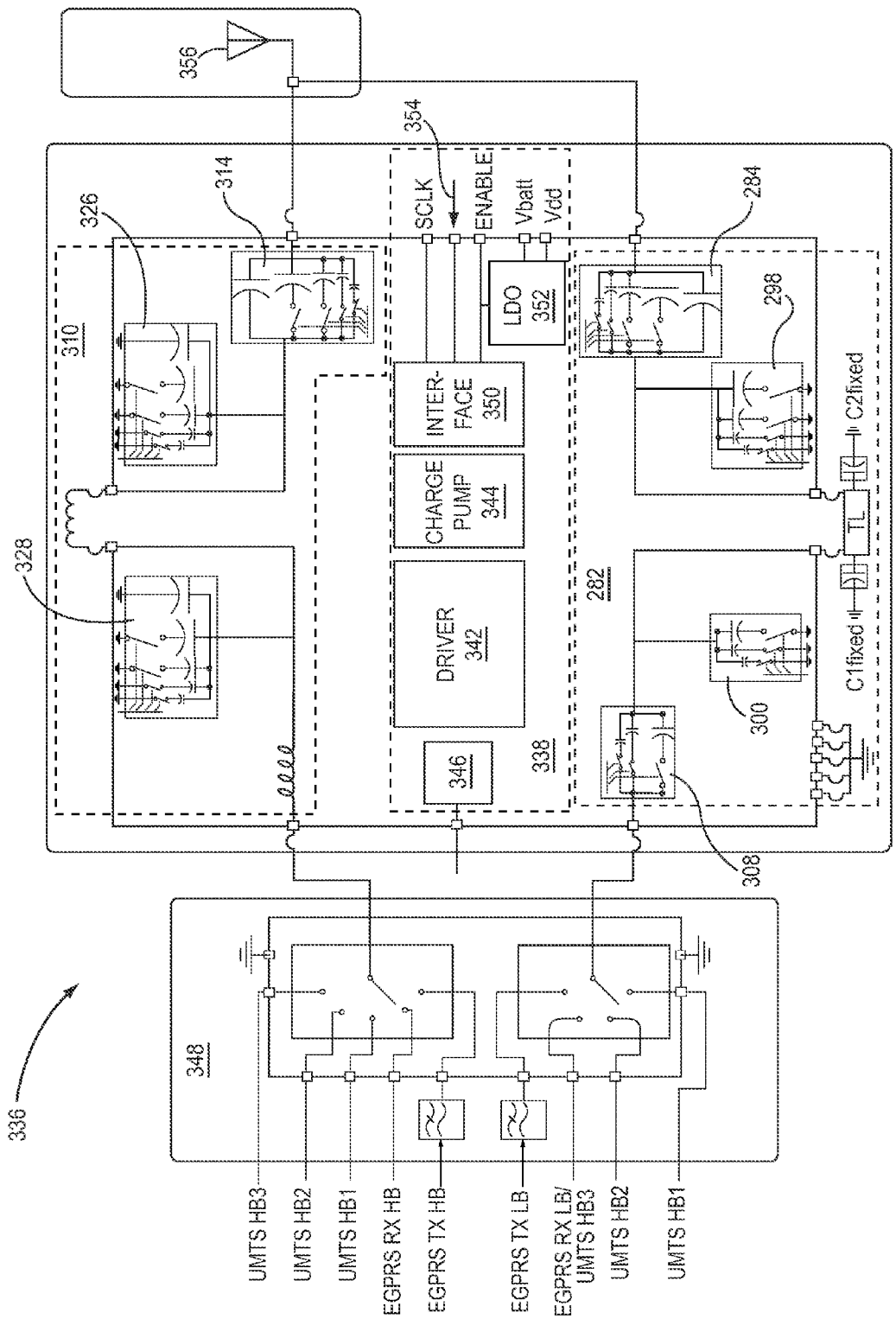
FIG. 21 illustrates another embodiment of a dual band antenna tuner.

FIG. 21 has essentially the same components as those described above for FIG. 20, except that only a single high-band/low-band antenna 356 is used for both low-band and high-band operation. The high-band/low-band antenna 356 is coupled to both of the antenna tuner 282 and the antenna tuner 310. The first capacitive elements 284, 314 may be set to its minimum value when one of the antenna tuners 282, 310 is turned off while the other antenna tuner 310, 282 is turned on. This configuration allows for the use of one high-band/low-band antenna 356 to provide both low-band and high-band operation and either low-band and high-band operation may be selected by manipulating the capacitive value of the first capacitive elements 284, 314 to thereby select the antenna tuner 282, 310.

Those skilled in the art will recognize improvements and modifications to the preferred embodiments of the present disclosure. All such improvements and modifications are considered within the scope of the concepts disclosed herein and the claims that follow.

What is claimed is:

1. An antenna tuning system operable to provide matching simultaneously at a first transmission frequency and a first receive frequency, the antenna tuning system comprising:
   a first antenna tuner configured to provide a first pass band having a first resonant frequency and a second resonant frequency, the first antenna tuner comprising:
      a first low-pass pi network, the first low-pass pi network comprising:
         a first shunt connected segment configured to provide a first variable capacitance;
         a second shunt connected segment configured to provide a second variable capacitance;
         a first series connected segment coupled between the first shunt connected segment and the second shunt connected segment and configured to provide a first inductance;
      a first capacitive element configured to provide a third variable capacitance wherein the first capacitive element is coupled in series with the first low-pass pi network; and
   an antenna tuner control system operably associated with the first antenna tuner, the antenna tuner control system being operable to control the first variable capacitance, the second variable capacitance, and the third variable capacitance so as to degrade the first pass band of the antenna tuner between the first resonant frequency and the second resonant frequency to provide higher Q-factors at the first resonant frequency and the second resonant frequency.

2. The antenna tuning system of claim 1, wherein the first resonant frequency is positioned around a first edge of the first pass band and the second resonant frequency is positioned around a second edge of the first pass band.

3. The antenna tuning system of claim 1, wherein the antenna tuner control system is operable to set the first variable capacitance and the second variable capacitance such that the first transmission frequency is within the 3 dB bandwidth of the first resonant frequency and the first receive frequency is within 3 dB bandwidth of the second resonant frequency.

4. The antenna tuning system of claim 1, further comprising:
   a first antenna having a second inductance;
   the first capacitive element being coupled in series between the first antenna and the low-pass pi network such that the third variable capacitance and the second inductance are operable to provide a series resonance between the first antenna and the first capacitive element that sets a first intermediate frequency of the first pass band between the first resonant frequency and the second resonant frequency; and
   the antenna tuner control system being operable to transpose the first pass band by controlling the third variable capacitance.

5. The antenna tuning system of claim 4, wherein the antenna tuner control system is operable to transpose the first pass band so that the first intermediate frequency of the first pass band is placed between the first transmission frequency and the first receive frequency.

6. The antenna tuning system of claim 5, wherein the antenna tuner control system is operable to transpose the first pass band so that the first intermediate frequency of the first pass band is placed between a second transmission frequency and a second receive frequency.

7. The antenna tuning system of claim above 6, wherein:
   the first transmission frequency defines a first physical uplink channel;
   the first receive frequency defines a first physical downlink channel, wherein the first physical uplink channel and the first physical downlink channel are associated with a first transport channel;
   the second transmission carrier frequency is associated with a second physical uplink channel; and
   the second receive carrier frequency is associated with a second physical downlink channel, wherein the second physical uplink channel and the second physical downlink channel are associated with a second transport channel.

8. The antenna tuning system of claim 4, wherein the antenna tuner control system is operable to control the first variable capacitance, the second variable capacitance, and the third variable capacitance, so as to adjust a frequency span of the first pass band.

9. The antenna tuning system of claim 8, wherein the antenna tuner control system is configured to transpose the pass band by controlling the first variable capacitance.

10. The antenna tuning system of claim 4, further comprising:
    the first antenna comprising a high-band antenna;
    a low-band antenna, wherein the low-band antenna has a third inductance;
    a second antenna tuner configured to provide a second pass band having a third resonant frequency and a fourth resonant frequency, the second antenna tuner comprising:
       a second low-pass pi network, the second low-pass pi network comprising:
          a third shunt connected segment configured to provide a fourth variable capacitance;
          a fourth shunt connected segment configured to provide a fifth variable capacitance;
          a second series connected segment coupled between the third shunt connected segment and the fourth shunt connected segment and configured to provide a fourth inductance; and
       the antenna tuner control system is operable to set the fourth variable capacitance and the fifth variable capacitance so that the second transmission frequency is within a 3 dB bandwidth of the third resonant frequency and the second receive frequency is within a 3 dB bandwidth of the fourth resonant frequency is within 3 decibels of a second receive frequency.

11. The antenna tuning system of claim 1, further comprising:
    the first series connected segment having a first node and a second node wherein the first capacitive element is coupled to the low-pass pi network at the first node; and
    a second capacitive element having a fourth variable capacitance, wherein the second capacitive element is coupled to the low-pass pi network at the second node.

12. The antenna tuning system of claim 1, further comprising:
    the first series connected segment has a first node and a second node wherein the first capacitive element is coupled to the low-pass pi-network at the first node; and
    an inductive element having a second inductance and coupled in series with the low-pass pi network at the second node.

13. The antenna tuning system of claim 1, wherein:
    the first shunt connected segment comprises a first programmable capacitor array configured to provide the first variable capacitance; and
    the second shunt connected segment comprises a second programmable capacitor array configured to provide the second variable capacitance.

14. The antenna tuning system of claim 13, wherein:
    the first shunt connected segment further comprises a first inductor coupled in parallel with the first programmable capacitor array; and
    the second shunt connected segment further comprises a second inductor coupled in parallel with the second programmable capacitor array.

15. The antenna tuning system of claim 1, wherein the first series connected segment comprises a first inductor configured to provide the first inductance.

16. The antenna tuning system of claim 15, wherein the first series connected segment further comprises a fourth capacitive element configured to provide a fourth variable capacitance and coupled in series with the first inductor.

17. The antenna tuning system of claim 1, wherein the first series connected segment comprises a first transmission line that is configured to provide the first inductance.

18. The antenna tuning system of claim 1, wherein the first capacitive element comprises a first programmable capacitor array configured to provide the third variable capacitance.

19. A transceiver, comprising:
    a transmitter circuit operable to up convert a first transmission signal into a first physical uplink channel;
    a receiver circuit operable to down convert a first receive signal out of a first physical downlink channel;
    an antenna tuner operably associated with the transmitter circuit and the receiver circuit, wherein the antenna tuner is configured to provide a first pass band having a first resonant frequency and a second resonant frequency, the antenna tuner comprising:
       a first low-pass pi network, the first low-pass pi network comprising:

a first shunt connected segment configured to provide a first variable capacitance;

a second shunt connected segment configured to provide a second variable capacitance;

a first series connected segment coupled between the first shunt connected segment and the second shunt connected segment and configured to provide a first inductance;

a first capacitive element configured to provide a third variable capacitance wherein the first capacitive element is coupled in series with the first low-pass pi network; and an antenna tuner control system operably associated with the antenna tuner to control the first variable capacitance, the second variable capacitance, and the third variable capacitance such that the first physical uplink channel is within a 3 dB bandwidth of the first resonant frequency and the first physical downlink channel is within a 3 dB bandwidth of the second resonant frequency and so as to degrade the first pass band of the antenna tuner between the first resonant frequency and the second resonant frequency to provide higher Q-factors at the first resonant frequency and the second resonant frequency.

20. The transceiver of claim 19, wherein the first physical uplink channel and the first physical downlink channel are associated with a first transport channel.

21. The transceiver of claim 20, wherein the first physical uplink channel is selected from a group consisting of an uplink dedicated physical control channel, an uplink enhanced dedicated physical control channel, an uplink high speed dedicated physical control channel, an uplink physical random access channel, an uplink common physical control channel.

22. The transceiver of claim 20, wherein the first physical downlink channel is selected from a group consisting of a downlink dedicated physical channel, a downlink enhanced dedicated physical channel, a downlink fractional dedicated physical channel, a downlink enhanced dedicated relative grant channel, a downlink enhanced hybrid indicator channel, a downlink physical random access channel, a downlink primary common control physical channel, a downlink secondary common control physical channel, and a downlink high speed shared control physical channel.

23. The transceiver of claim 19, further comprising:

a transceiver power control system having the antenna tuner control system, wherein the transceiver power control system is operable to receive transmission power control information for adjusting the first transmission signal to a first desired transmission power level and wherein the transmission power control information is from the first receive signal;

the transmitter circuit further comprising a coupler that is connected to generate a transmit feedback signal having a signal level associated with a current power level of the first transmission signal; and the antenna tuner control system being operable to adjust the pass band based on the transmission power control information and the signal level of the transmit feedback signal so as to reduce a difference between the current power level of the first transmission signal and the first desired transmission power level.

24. The transceiver of claim 19, further comprising:

a transceiver power control system having the antenna tuner control system, wherein the transceiver power control system is operable to provide receive power control information for adjusting the first receive signal to a first desired receive power level and being operably associated with the receiver circuit so as to provide a receive signal power measurement associated a current power level of the first receive signal; and the antenna tuner control system being operable to adjust the pass band based on the receive power control information and the receive signal power measurement so as to reduce a difference between the current power level of the first receive signal and the first desired receive power level.

25. The transceiver of claim 19, further comprising a first antenna having a second inductance, wherein the first capacitive element is coupled so as to series resonate with the antenna.

* * * * *